US008910861B2

(12) United States Patent
Wadia

(10) Patent No.: US 8,910,861 B2
(45) Date of Patent: Dec. 16, 2014

(54) AUTOMATIC TELLER MACHINE ("ATM") INCLUDING A USER-ACCESSIBLE USB PORT

(75) Inventor: Rustam N. Wadia, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 108 days.

(21) Appl. No.: 13/440,244

(22) Filed: Apr. 5, 2012

(65) Prior Publication Data
US 2013/0264384 A1  Oct. 10, 2013

(51) Int. Cl.
G06Q 40/00  (2012.01)

(52) U.S. Cl.
USPC .................................. 235/379; 705/43; 902/8

(58) Field of Classification Search
USPC ............................. 235/379; 705/43; 902/8–9
See application file for complete search history.

(56) References Cited

U.S. PATENT DOCUMENTS

| 5,933,515 | A | 8/1999 | Pu et al. |
| 5,949,348 | A | 9/1999 | Kapp et al. |
| 6,145,053 | A | 11/2000 | Smith |
| 6,229,906 | B1 | 5/2001 | Pu et al. |
| 6,373,967 | B2 | 4/2002 | Pu et al. |
| 6,393,139 | B1 | 5/2002 | Lin et al. |
| 6,651,168 | B1 | 11/2003 | Kao et al. |
| 6,654,484 | B2 | 11/2003 | Topping |
| 6,944,773 | B1 | 9/2005 | Abrahams |
| 7,270,275 | B1 | 9/2007 | Moreland et al. |
| 7,360,248 | B1 | 4/2008 | Kanevsky et al. |
| 7,362,973 | B1 | 4/2008 | Dickson et al. |
| 7,451,116 | B2 | 11/2008 | Parmelee et al. |
| 7,477,239 | B2 | 1/2009 | Ray |
| 7,486,810 | B1 | 2/2009 | Accapadi |
| 7,992,007 | B2 | 8/2011 | Lazzaro et al. |
| 2001/0043726 | A1 | 11/2001 | Ikebata et al. |
| 2001/0049785 | A1 | 12/2001 | Kawan et al. |
| 2001/0052541 | A1* | 12/2001 | Kang et al. ................... 235/379 |
| 2002/0188872 | A1 | 12/2002 | Willeby |
| 2003/0135764 | A1 | 7/2003 | Lu |
| 2003/0209599 | A1* | 11/2003 | Gatto ............................ 235/379 |
| 2004/0053692 | A1* | 3/2004 | Chatigny et al. ................ 463/36 |
| 2004/0151353 | A1 | 8/2004 | Topping |
| 2004/0257238 | A1* | 12/2004 | De Jongh ...................... 340/825 |
| 2005/0010649 | A1 | 1/2005 | Payne et al. |

(Continued)

FOREIGN PATENT DOCUMENTS

CN  2694364  4/2005
EP  1956566 A2 *  8/2008  ............... G07F 7/10

Primary Examiner — Michael G Lee
Assistant Examiner — Laura Gudorf
(74) Attorney, Agent, or Firm — Weiss & Arons LLP; Michael A. Springs, Esq.

(57) ABSTRACT

Systems and methods for authenticating a user's identity at an ATM are provided. A method for authenticating a user's identity at an Automated Teller Machine ("ATM") includes using a first receiver to receive information from an ATM touch screen relating to a first numerical digit and a second numerical digit selected by the user. The method further includes using a second receiver to receive information from a fingerprint scanner relating to first biometric information input into the fingerprint scanner and second biometric information input into the fingerprint scanner, wherein the fingerprint scanner is removably coupled to the ATM via a USB port included in a secured portion of the ATM, the secured portion of the ATM being inaccessible to the user. The method may also include using a transmitter to transmit the information received by the first receiver and the second receiver to a remote server.

27 Claims, 17 Drawing Sheets

(56) References Cited

U.S. PATENT DOCUMENTS

| | | |
|---|---|---|
| 2005/0111709 A1 | 5/2005 | Topping |
| 2006/0104486 A1 | 5/2006 | Le Saint et al. |
| 2006/0224523 A1 | 10/2006 | Elvitigala |
| 2006/0224645 A1 | 10/2006 | Kadi |
| 2007/0140530 A1 | 6/2007 | Coogan et al. |
| 2008/0016276 A1* | 1/2008 | Hong .......................... 711/115 |
| 2008/0072331 A1 | 3/2008 | Dickson et al. |
| 2008/0126260 A1* | 5/2008 | Cox et al. ..................... 705/67 |
| 2008/0169944 A1 | 7/2008 | Howarth et al. |
| 2008/0226146 A1 | 9/2008 | Niklan |
| 2009/0173781 A1* | 7/2009 | Ramachandran ............ 235/379 |
| 2009/0326732 A1 | 12/2009 | Dickson et al. |
| 2010/0027045 A1 | 2/2010 | Moore |
| 2010/0059587 A1 | 3/2010 | Miller et al. |
| 2010/0174653 A1 | 7/2010 | Tian et al. |
| 2010/0293605 A1 | 11/2010 | Longobardi |
| 2011/0156865 A1 | 6/2011 | Baek et al. |

\* cited by examiner

AUTOMATIC TELLER MACHINE ("ATM") INCLUDING A USER-ACCESSIBLE USB PORT

FIELD OF TECHNOLOGY

Aspects of the invention relate to preventing unauthorized capture of a confidential Automated Teller Machine ("ATM") access sequence.

BACKGROUND

ATMs provide banking customers with the ability to withdraw funds, deposit funds and access bank account information. Because of their highly automated functions, ATMs are generally able to operate without the supervision of a human clerk. As a result, many ATMs are located in a variety of locations remote from banking centers. For example, ATMs may be placed on street corners, at convenience stores, supermarkets or sports arenas. This wide variety of ATM locations provides banking customers with quick access to cash and bank account information in multiple locations.

However, the lack of human supervision at the multiple ATM locations creates the risk of a thief compromising the security of one or more of the ATMs. For example, the thief may place a skimming device over an ATM card slot reader to capture information encrypted in a magnetic stripe of an inserted card. The thief may additionally use a thin keypad overlay affixed to the ATM's keypad to record buttons pressed by a customer. Alternatively, the thief may place a hidden camera on the ATM to record a video of the hand movements of the customer while inputting his PIN. Such information may subsequently be used to gain unauthorized access to the customer's cash and bank account information.

Skimmer devices, keypad overlays and hidden cameras are becoming increasingly common and difficult to detect. A skimmer or keypad overlay may look and feel like a legitimate part of the ATM and may operate in a manner transparent to a customer. A hidden camera the size of a pinhole is sufficient to record PIN information, thus enabling the camera to be easily hidden and hard to identify.

According to the European ATM Security Team (EAST), a not-for-profit payment security organization, ATM crimes in Europe increased 149 percent between 2007 and 2008. Most of the increase has been linked to ATM skimming attacks. During 2008, a total of 10,302 skimming incidents were reported in Europe. In the United States, between April and May of 2010, one bank estimated losses of over 200,000 USD due to compromised PIN numbers.

Therefore, it is desirable to provide systems and methods to reduce the capture and replication of a banking customer's user identification information. Specifically, it is desirable to provide at an ATM a customer authentication method that is difficult to be captured and replicated by an unauthorized user.

SUMMARY OF THE DISCLOSURE

It is an object of this invention to provide systems and methods for authenticating the identity of a user at an ATM. A method for authenticating a user's identity at an Automated Teller Machine ("ATM") includes using a first receiver to receive information from an ATM touch screen relating to a first numerical digit and a second numerical digit selected by the user. The method further includes using a second receiver to receive information from a fingerprint scanner relating to first biometric information input into the fingerprint scanner and second biometric information input into the fingerprint scanner, wherein the fingerprint scanner is removably coupled to the ATM via a USB port included in a secured portion of the ATM, the secured portion of the ATM being an inaccessible to the user. The method may also include using a transmitter to transmit the information received by the first receiver and the second receiver to a remote server via a telecommunications network.

BRIEF DESCRIPTION OF THE DRAWINGS

The objects and advantages of the current invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
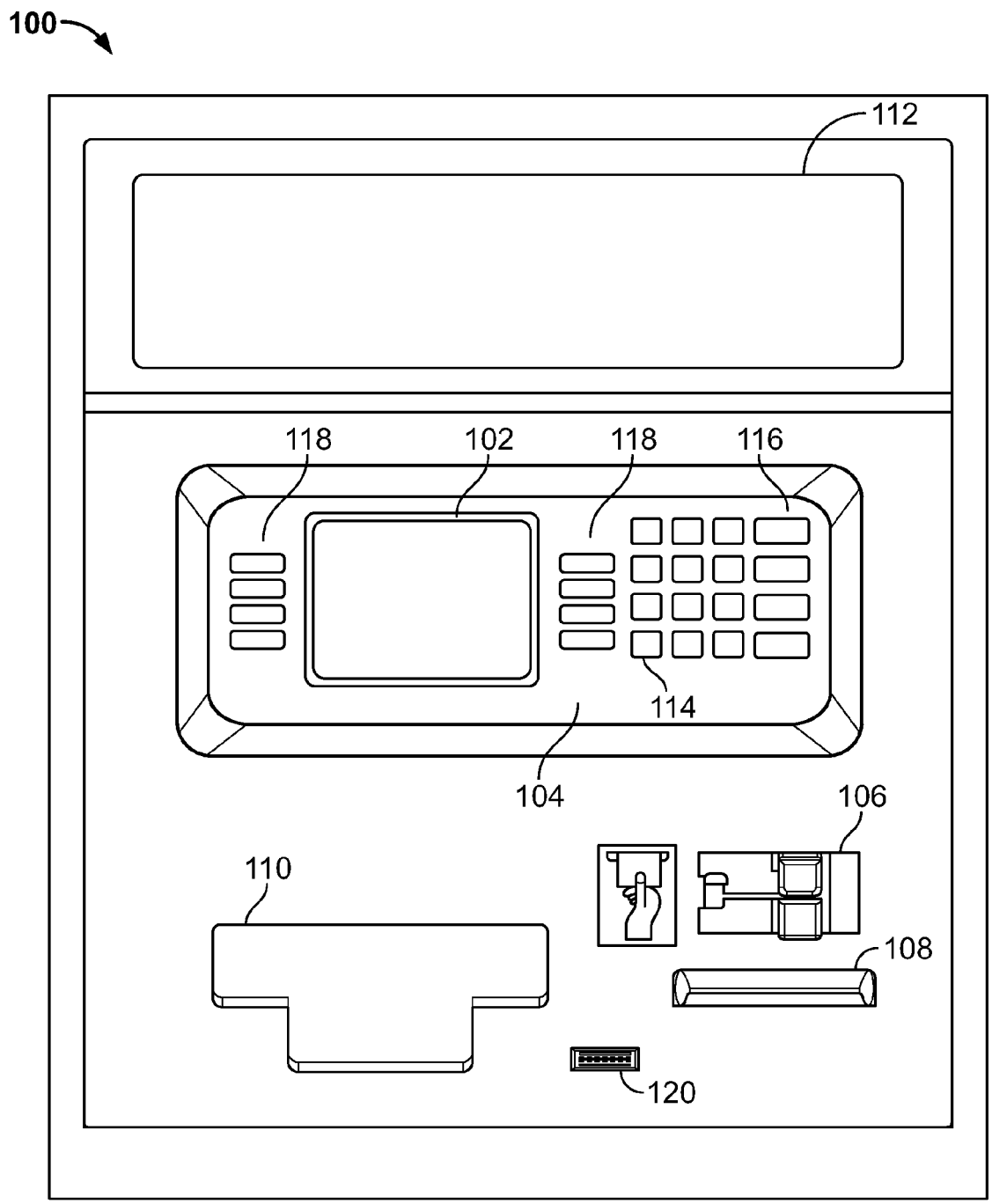
FIG. 1 shows an apparatus for use according to the principles of the invention.

Systems and methods for providing a more secure Automated Teller Machine ("ATM") transaction are provided. The systems and methods of the invention may increase the difficulty of capturing and replicating a user's identification information at one or more ATMs.

The systems and methods of the invention may include an ATM. In some embodiments, the ATM may include one fingerprint scanner or a plurality of fingerprint scanners. Each of the fingerprint scanner(s) may be configured to capture a digital image of a fingerprint placed on the fingerprint scanner. The ATM may also include one display screen or a plurality of display screens. Each of the fingerprint scanner(s) may be associated with one of the display screen(s). In some embodiments, a fingerprint scanner associated with a display screen may be located proximal to the display screen.

It should be noted that a fingerprint scanner for use in the systems and methods of the invention may use optical fingerprint imaging, ultrasonic sensors, capacitance sensors (passive or active) and/or any other suitable method to capture the digital image of a fingerprint. It should additionally be noted that a display screen for use in the invention may include an LED display, a digital display, a portion of a touch screen and/or any other suitable display.

Each of the display screens may display a number. In some embodiments, each of the numbers 0-9 may be displayed on at least on one of the display screens. The display screens may display the numbers in an order different from an ascending numerical order. The display screens may also display the numbers in a layout different from a conventional numeric layout where the number "1" appears in the top left corner, the number "9" appears in the bottom right corner the number "0" appears in the fourth row, etc. Instead, certain embodiments of the invention include the display screens displaying a randomized numerical layout. For example, a display screen in the top left position may display the number "5" instead the number "1" and a display screen in the bottom right corner may display the number "3" instead of the number "9." In these embodiments, each of the display screens may display any one of the numbers 0-9 during a randomized display.

In other embodiments, a dynamic display may randomize only a subset of numbers typically located in a single row or single column of a conventional numeric layout. For example, the numbers "1, 2, 3," which typically appear in the top row of a conventional numeric layout, may be dynamically displayed, in that row, as "3, 1, 2." Alternatively, the numbers "3, 6, 9," which typically appear in the last column of a conventional numeric layout, may be dynamically displayed, in that column, as "9, 6, 3." In these embodiments, each row or column may be randomized individually, retaining the digits conventionally associated with the row or column.

In yet other embodiments, a first subset of display screens may be configured to display two or more numerical digits and a second subset of display screens may be configured to display a single numerical digit. For example, only the top two rows of display screens may display two or more numerical digits. While the bottom rows of display screens may display the numerical digits typically located in a conventional numeric layout. In yet other embodiments, the ATM may include one or more display screens and one or more conventional keys that include a number affixed to the conventional key.

Embodiments of dynamic displays are described in co-pending, commonly-assigned, U.S. patent application Ser. No. 12/983,920, entitled "Dynamic Touch Screen for Automated Teller Machines ("ATMS")," filed on Jan. 4, 2011, which is hereby incorporated herein by reference in its entirety.

A user may approach an ATM according to the systems and methods of the invention and input user identification information. For example, the user may swipe a user banking card in an ATM card reader, transmit user identification information stored on a mobile phone using near field communications ("NFC") and/or enter user identification information using any other suitable method.

After inputting the user identification information, the user may be prompted to select his PIN number. In some embodiments, upon input of the user identification information, each of the display screen(s) may display substantially immediately thereafter a numerical digit. The numerical digits displayed may be in a randomized layout different from the conventional numeric layout. In other embodiments, after a user inserts his bank card into the ATM card reader, the display screen(s) may be blank. In these embodiments, touching one of the fingerprint scanners may initiate each of the display screen(s) to display a randomized layout different from the conventional numerical layout. In yet other embodiments, after a user inserts his bank card, two or more of the display screens may display numerical digits different from the numerical digits displayed prior to the user's insertion of his bank card.

The user may select the first number of his PIN by placing a finger on a fingerprint scanner associated with a display screen displaying the first number of his PIN. In some embodiments of the invention, upon receipt of the user biometric information, one or more of the display screens may alter their display. The one or more display screens may alter their display to display a number different from the number displayed prior to the user's selection of the first number of his PIN.

In some embodiments, one or more display screens may alter their display substantially immediately after each input of user biometric information. This may be desirable at least because minimizing the amount of time that a selected number is displayed may increase the difficulty for an observer or machine to observe the number selected. Thus, in some of these embodiments, the input of the last PIN number may generate an additional randomized display or may initiate the display screens to display a blank display in order to reduce the display time of the numerical digits.

In some embodiments of the invention, the numbers displayed by the display screens may remain static at least until the user inputs each of his PIN numbers. In yet other embodiments of the invention, the number of times that one or more display screens alter their display after the receipt of user biometric information may be dynamic. For example, while entering a four digit PIN, two or more of the display screens may alter their display one to four times.

It should be noted that the number of dynamic displays may be randomized, user defined or system defined. It should additionally be noted that a user may be offered the option of opting-out and/or of opting-in to be presented with a dynamic display. In some embodiments, the option to display a conventional layout may be executed any time during an ATM transaction. In some embodiments, the user may be presented with an option to display a conventional layout after at least one failed attempt to enter a correct PIN. In some embodiments, a user may be presented with a message reminding the user that the display is dynamically presented.

It should additionally be noted that a user may be presented with the option of using his biometrics at an ATM before receiving a banking card. In some embodiments, in the event that a user does not desire to use biometrics at an ATM, the banking institution may issue to the user a banking card with a banking card number. The banking card number may include one or more digits, series of digits, or digits that when operated on, produce a sequence of numbers. Any of these digits, series of digits, or sequence of numbers may notify an ATM and/or a central server that the user's ATM identification will not include biometrics. In these embodiments, the ATM may not prompt the user to input biometrics and/or the central server may not require biometric information to validate the user's identity.

In some embodiments, in the event that a user does desire to use biometrics at an ATM, the user's banking card may include a banking card number with one or more digits, series of digits, or digits that when operated on, produce a sequence of numbers. Any of these digits, series of digits, or sequence of numbers may notify an ATM and/or a central server that the user's ATM identification includes biometrics. In these embodiments, the ATM may prompt the user to input biometrics and/or the central server may require biometric information to validate the user's identity.

The user may then select his second PIN number. The user may select his second PIN number by placing a finger on a fingerprint scanner associated with a display screen displaying his second PIN number. The user may repeat this process until he has selected each of his PIN numbers. It should be noted that the invention includes a PIN of any desirable length, such as a four-digit PIN, a six-digit PIN or any other suitable PIN length.

In some embodiments of the invention, the user may place the same finger on each fingerprint scanner while selecting his PIN. In other embodiments, the user may use a sequence of fingers to select his PIN. In some of these embodiments, each finger in the sequence of fingers may be used to select a PIN number. The finger, or sequence of fingers, used by the user to select his PIN may be randomly chosen by the user, user defined or system defined. In some embodiments where the finger or sequence of fingers is system defined, instructions may be displayed on an ATM screen informing the user of which finger to use, or which sequence of fingers to use, while selecting his PIN. It should be noted that, in some embodiments, the user may place two or more fingers on the fingerprint scanner while selecting his PIN.

A fingerprint sequence used by a user to select his PIN may include fingers from a single hand. An exemplary fingerprint sequence may include: $1^{st}$ finger, $3^{rd}$ finger, $4^{th}$ finger, thumb. Alternatively, a fingerprint sequence may combine different fingers from the right ("R") and left ("L") hands. An exemplary fingerprint sequence combining different fingers from the right and left hands may include: $1^{st}$ finger of L hand, $1^{st}$ finger of R hand, $3^{rd}$ finger of L hand and $1^{st}$ finger of L hand. It should be noted that, in some embodiments, a user may input his PIN using the prints of digits of his right and/or left foot. In these embodiments, the ATM may include biometric scanners in locations that accommodate the receipt of the prints of digits of a foot.

Embodiments of fingerprint sequences are described in co-pending, commonly-assigned U.S. patent application Ser. No. 12/983,936, entitled "Utilization of Digit Sequences for Biometric Authentication," filed on Jan. 4, 2011, which is hereby incorporated herein by reference in its entirety.

A user may be required to select his PIN in sequential order, starting from the first PIN number and ending with the last PIN number. For example, a user with PIN '6137' may enter his PIN by (1) touching a fingerprint scanner associated with the number '6,' (2) touching a fingerprint scanner associated with the number '1,' (3) touching a fingerprint scanner associated with the number '3' and (4) touching a fingerprint scanner associated with the number '7.'

In other embodiments, a user may enter the digits of his PIN in any order. For example, in these embodiments, the user with PIN '6137' may enter his PIN by: (1) touching a fingerprint scanner associated with the number '1,' (2) touching a fingerprint scanner associated with the number '6,' (3) touching a fingerprint scanner associated with the number '7' and (4) touching a fingerprint scanner associated with the number '3.'

Upon input of user biometric information into a fingerprint scanner, a transmitter may substantially immediately transmit at least a portion of the input biometric information to a receiver. The transmitter may also transmit information relating to the PIN number displayed on the display screen associated with the fingerprint scanner during the receipt of the biometric information. The transmitter may transmit the biometric and PIN number information each time the fingerprint scanner receives user biometric information.

In the event that the ATM determines that information relating to a complete user PIN sequence has been received, the ATM may encrypt at least a portion of the received user identification information, biometric information and PIN numbers. The ATM may subsequently route the encrypted information to a remote location via a telecommunications network. In some embodiments, the remote location may be associated with a third party such as an interbank network, authorization system, or any other suitable platform configured to authorize or assist in the authorization of one or more financial transactions. The third party may be referred to hereinafter as an "ATM server."

In some embodiments, the ATM may route the encrypted information to the ATM server. Upon receipt of the information, the ATM server may initiate the validation of the biometric information and the PIN numbers. In the event that the biometric information and the PIN numbers are determined to identify a user associated with the user identification information, the ATM server may transmit a message to the ATM, instructing the ATM to initiate a user banking session.

In some embodiments, the ATM server may initiate the validation of the user's identity by decrypting a card number included in the user identification information. The ATM server may subsequently retrieve a PIN offset value, stored in one or more databases, that is associated with the card number. The ATM server may retrieve the PIN offset value by querying the one or more databases.

The ATM server may then send the card number, PIN offset value and input PIN number to a PIN processor. The PIN processor may run a cryptographic function and a key on the card number to get an encrypted number. The key may be a piece of information that determines the functional output of the cryptographic function.

The PIN processor may then take the first four digits of the encrypted number, subtract it from the offset value, and determine if the resultant number matches the input PIN number. A match may indicate that the input PIN is the PIN number associated with the user identification information. The PIN processor may transmit to the ATM server information relating to the validity or invalidity of the input PIN.

After or during the validation of the input PIN, the ATM server may initiate the validation of the biometric information using one or more matching algorithms. The ATM server may validate the biometric information by retrieving user biometric information associated with the card number. The ATM server may retrieve the user biometric information by querying one or more databases.

The retrieved user biometric information may include one or more stored templates. The stored templates may be associated with user identification information, such as a user card number, in the one or more databases. Each of the stored templates may include information relating to at least a portion of a user fingerprint. In exemplary embodiments, the user may input user fingerprint information into a fingerprint scanner located at a banking institution. The input fingerprints may be subsequently stored in the one or more databases. It should be noted that the user may input user fingerprint information in any location suitable to receive user fingerprint information. The input information may be transmitted to the ATM server and subsequently stored in the one or more databases.

A matching algorithm may then be used to compare a stored template against images of one or more fingerprints received from ATM fingerprint scanner(s). It should be noted that, in the embodiments wherein a user may use one or more fingerprints in any desired order to select his PIN, the matching algorithm may compare each of the received fingerprint images against each of the stored templates.

In the embodiments wherein a user uses a fingerprint sequence to input his PIN, each of the images of the fingerprints received may be compared against a single stored template. In these embodiments, the template used for validation of a user fingerprint may be selected based on the order in which the fingerprint was received. For example, a fingerprint that was received after two prior fingerprints may be compared against a template associated with the third fingerprint. In these embodiments, the information transmitted to the ATM server may include an identifier associated with each fingerprint that had been input into a fingerprint scanner. This identifier may inform the matching algorithm of the temporal order in which each fingerprint was received by the ATM (i.e. first, second, third, etc.).

In some embodiments, the matching algorithm may compare a stored template and a received image of a fingerprint by comparing a pattern of ridges and valleys in the stored template with a pattern of ridges and valleys included in the received image. The matching algorithm may execute this comparison by laying one image over another and determining the degree to which they match. In the event that the stored template and received image are similar at or above a threshold level, the matching algorithm may determine that the received fingerprints have properly identified the user associated with the user identification information.

In some embodiments, the matching algorithm may compare the stored template and the received image by comparing certain features of the received image with corresponding features included in the previously stored template. For example, the matching algorithm may compare certain minutiae and/or basic fingerprint patterns included in the stored template with the corresponding minutiae and/or basic fingerprint patterns included in the received image. The minutiae may include one or more of a ridge ending, bifurcation and/or short ridge (or dot). The basic fingerprint patterns may include the arch, whorl and loop. It should be noted that, in these embodiments, the one or more databases may store the type, size and orientation of the aforementioned patterns in addition to the stored template.

In these embodiments, the matching algorithm may graphically compare the received image with the stored template and determine the degree to which they match. In some embodiments, the matching algorithm may be required to find a predetermined number of minutiae patterns that the two prints have in common. In the event that the predetermined number of minutiae patterns are determined to match at, or above, a threshold amount, the matching algorithm may determine that the received fingerprints have properly identified the user associated with the user identification information.

In some embodiments, the ATM server may validate the biometric information by retrieving a stored user fingerprint sequence associated with the card number. The ATM server may retrieve the fingerprint sequence by querying one or more databases.

A matching algorithm may then determine, based on the received biometric information, a fingerprint sequence used by the user while inputting his PIN. For example, the matching algorithm may use the received images of the fingerprints, angles at which the images were received and/or a force resultant on the fingerprint scanner during the input of the biometric information, to determine the user's fingerprint sequence. Upon identification of the user fingerprint sequence, the matching algorithm may compare the identified fingerprint sequence to the stored fingerprint sequence. If the identified and stored fingerprint sequences are the same, the matching algorithm may validate the input fingerprint sequence. It should be noted that these embodiments may or may not include verifying whether or not the input fingerprints are fingerprints associated with the user.

One skilled in the art will appreciate that the aforementioned descriptions of PIN validation and user fingerprint validation are exemplary only. Any suitable method for PIN validation and fingerprint validation may be used to validate the input PIN and fingerprints.

In the event that the ATM server verifies that both the user PIN and the biometric information identify a user associated with the user identification information, the ATM server may authorize the ATM to initiate a user banking session. In the event that the ATM server determines that either the user PIN and/or the biometric information fail to identify the user, the ATM server may instruct the ATM server to deny user access to the ATM.

It should be noted that, in some embodiments, in the event that a central server determines that a user entered an incorrect PIN, the display screens may present another randomized digital display. A user may then be presented with the option of re-entering his PIN. Alternatively, the system may display a conventional layout following a predefined or randomly chosen number of incorrect attempts.

In the event that a user banking session is initiated, the display screens may display a conventional numeric layout. Users may be more comfortable entering non-confidential data using a conventional layout. In other embodiments, the randomized display may remain static and/or change upon the initiation of the user banking session.

It should be noted that the display screens are not limited to displaying single numerical digits. Rather, the display screens may display two or more numerical digits, letters, words, or any other appropriate data.

As will be appreciated by one skilled in the art, although systems and methods of validating a user's identity at an ATM have been illustrated, systems and methods according to the invention may be applicable to other areas and other devices. For example, systems and methods according to the invention may be applied to any apparatus that requires the validation of a user's identity. For example, some embodiments of the invention may be applied to kiosks, pre-paid phone booths or any other suitable electronic device configured to authenticate the identity of a user.

Certain embodiments of the invention may also be implemented on one or more mobile devices. Exemplary mobile devices include mobile phones, personal computers, touch screen telephones, iPads, iPhones, Android phones, tablets, laptops and/or any other suitable electronic device. Exemplary usages of the invention with one or more of the aforementioned mobile devices include a user using a PIN and biometric identification in any method described herein to access to the mobile device itself, to access an application included on the device and/or access secured internet websites and/or to validate his identity to purchase items on the internet.

For example, a mobile device may include one or more fingerprint scanners to receive biometric information. The mobile device may also include numbers, letters and/or phrases selectable via a touch screen and/or mechanical keys. The systems and methods of the invention may then be implemented on the mobile device to verify the identity of the user using the one or more fingerprint scanners and the touch screen/mechanical keys.

Additionally, the systems and methods of the invention may be included in an application configured to be downloaded on a mobile device. In some embodiments, the application may be purchased prior to download. It should be noted that the application may be suitable to be downloaded to an Apple™ mobile device, Android™ mobile device or any other suitable device.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention described herein may take the form of an entirely hardware embodiment, an entirely software embodiment or an embodiment combining software, hardware and any other suitable approach or apparatus.

For example, the receipt and transmission of PIN and biometric information and/or the dynamic display of the display screen(s) may be embodied in whole or in part as a method, a data processing system, or a computer program product. Accordingly, the receipt and transmission of PIN and biometric information and/or the dynamic display of the display screen(s) may take the form of an entirely hardware embodiment, an entirely software embodiment or an embodiment combining software, hardware and any other suitable approach or apparatus.

Additionally, functions performed by the ATM, the ATM server, the PIN processor and/or the matching algorithm may be embodied in whole or in part as a method, a data processing system, or a computer program product. Accordingly, the ATM, the ATM server, the PIN processor and/or the matching algorithm may take the form of an entirely hardware embodiment, an entirely software embodiment or an embodiment combining software, hardware and any other suitable approach or apparatus.

Furthermore, aspects of the invention may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

For example, in the event that the receipt and transmission of PIN and biometric information and/or the dynamic display of the display screen(s) is embodied at least partially in hardware, the receipt and transmission of PIN and biometric information and/or the dynamic display of the display screen(s) may include one or more databases, receivers, transmitters, processors, modules including hardware and/or any other suitable hardware. Furthermore, the operations executed to carry out the receipt and transmission of PIN and biometric information and/or the dynamic display of the display screen(s) may be performed by the one or more databases, receivers, transmitters, processors and/or modules including hardware.

Additionally, in the event that the ATM, the ATM server, the PIN processor and/or the matching algorithm is embodied at least partially in hardware, the ATM, the ATM server, the PIN processor and/or the matching algorithm may include one or more databases, receivers, transmitters, processors, modules including hardware and/or any other suitable hardware. Furthermore, the operations executed by the ATM, the ATM server, the PIN processor and/or the matching algorithm may be performed by the one or more databases, receivers, transmitters, processors and/or modules including hardware.

FIG. 1 shows illustrative self-service device 100, which may be an ATM. Self-service device 100 may include monitor 102, keypad 104, card reader port 106, document acceptor 108, item dispenser 110 and security screen 112.

Monitor 102 may exchange visual and or audio information with a customer. Keypad 104 may include alphanumeric keys 114 for the customer to enter numerical and textual data. Keypad 104 may include control keys 116. In some embodiments, control keys 116 may be used to communicate control information, such as instructions, to self-service device 100. Keypad 104 may include soft keys 118. Soft keys 118 may have functions that are dictated by programming and are presented to the customer using information that may be displayed on monitor 102. It should be noted that one or more of keys 104, 114, 116 and 118 may be replaced and/or incorporated with one or more of the keys illustrated in FIGS. 8A-8F, 11 and 15-19.

Card reader port 106 may be the front end of any suitable card reader. The card reader may read magnetically encoded information on transaction instruments such as bank cards. In some embodiments, self-service device 100 may include a contactless chip reader, a wireless transceiver or any other suitable interface for exchanging transaction information with a transaction instrument. The transaction instrument may be a chip, an RFID tag, a smart card, a PDA, a telephone or any other suitable device.

In some embodiments, self-service device 100 may include a biometric sensor (not shown). The biometric sensor may identify a customer based on a feature, such as an anatomical feature, of the customer. For example, the biometric sensor may be configured to identify the customer based on all or part of a face, a fingerprint, an iris, a retina a hand or any other suitable anatomical feature. The biometric sensor may identify the customer based on a behavioral feature such as a signature, a voice, a gait or any other suitable behavioral feature. In some of these embodiments, information received by the biometric sensor may be used, in conjunction with PIN input and user fingerprint information, to validate the identity of the user.

For example, the biometric sensor may include an iris scanner. In some of these embodiments, a camera built into a ATM may be used as an iris scanner and authentication may require a sequence of fingerprints, an input PIN and an iris scan.

Document acceptor 108 may accept any suitable documents. For example, document acceptor 108 may accept envelopes, deposit forms, bills, checks or any other suitable documents. In some embodiments, document acceptor 108 may feed into a scanner that digitizes the documents for image-based transaction processing. Item dispenser 110 may dispense items. For example, item dispenser 110 may dispense bills. Security screen 112 may visually screen a surveillance device (not shown). The surveillance device may provide video information regarding individuals that are present near the self-service device and regarding the conditions thereabout.

Self-service device may optionally include USB port 120. USB port 120 may receive a USB jack from a user. The USB jack may be attached to a fingerprint scanner. In these embodiments, the fingerprint scanner may receive biometric information from the user. The USB may subsequently transmit the received biometric information to the ATM for user identification in accordance with the systems and methods of the invention.

Figure 2:
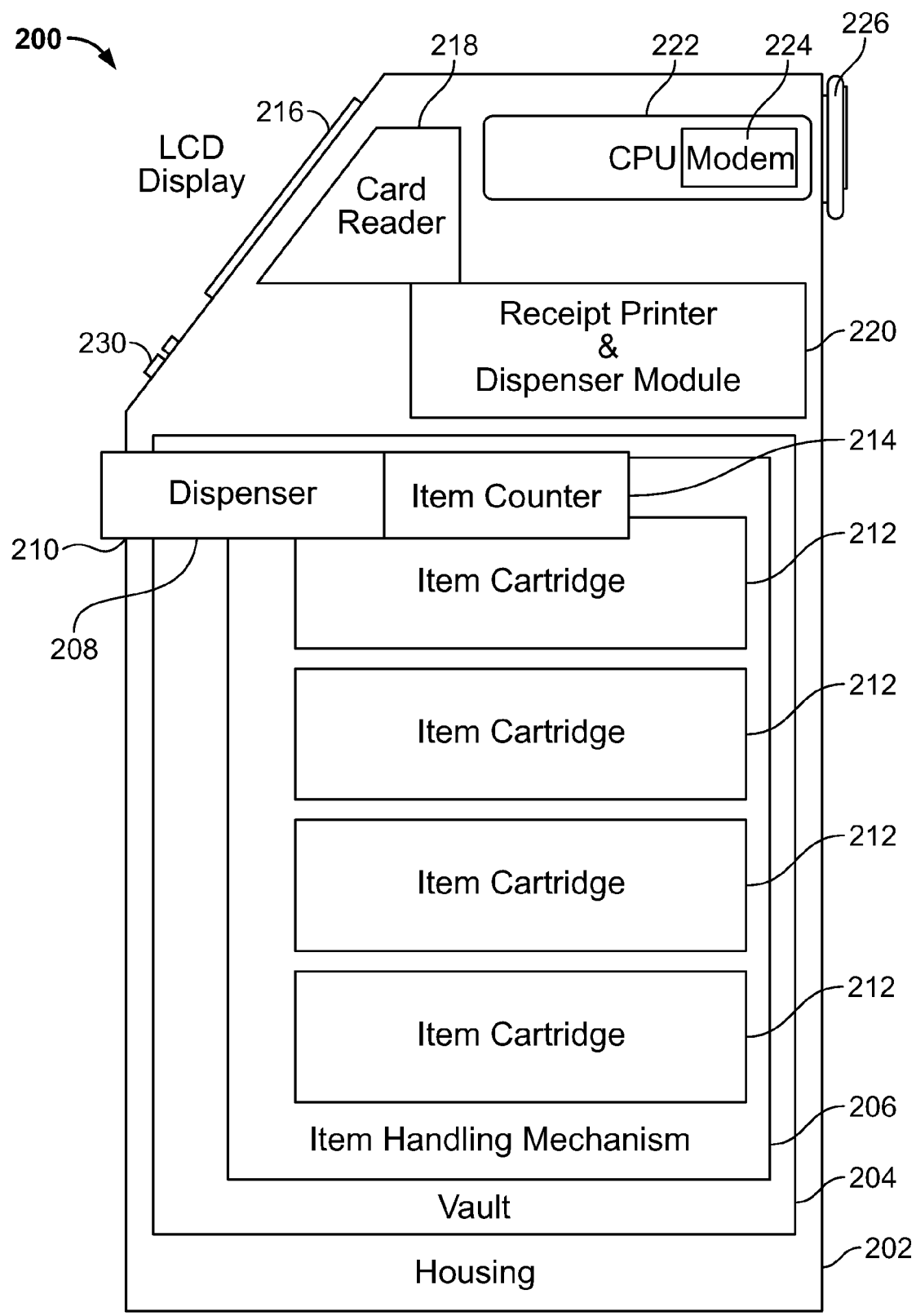
FIG. 2 shows a schematic diagram of another apparatus for use according to the principles of the invention.

FIG. 2 shows illustrative self-service device 200. Self-service device 200 may have one or more of the features of self-service device 100 (shown in FIG. 1). Self-service device 200 may include housing 202. Self-service device 200 may include vault 204. Vault 204 may include items (not shown). Item handling mechanism 206 may be present in vault 204. Item handling mechanism 206 may store, arrange, dispense and/or otherwise handle items for dispensing from self-service device 200. For example, item handling mechanism 206 may include conveyors (not shown) for positioning and repositioning items for dispensing by dispenser 208 through item port 210. Items (not shown) in item handling mechanism 206 may be contained in item cartridges 212. For example, when the items are bills, item cartridges 212 may be cash cartridges.

Item handling mechanism 206 may include item counter 214. Item counter 214 may count items prior to items being dispensed by dispenser 208.

Self-service device 200 may include LCD display 216 and a keypad (not shown) for customer interaction. The keypad may be a keypad including display screens and one or more fingerprint scanners that may be used in accordance with the systems and methods of the invention.

Card reader 218 may be present for receiving transaction information from the customer via a suitable transaction instrument. Self-service device 200 may include receipt printer and dispenser module 220. Receipt printer and dispenser module 220 may provide the customer with a record of a transaction. CPU 222 may control a customer input/output module ("I/O"), receipt of input PIN and biometric information, dispensing processes, which may include initialization, actuation, dispensing and any other suitable processes, receipt printing and dispensing, transaction channel communications and any other suitable processes. The transaction channel communications may be performed using modem 224, which may be any suitable communication device. Modem 224 may communicate with a local or regional network router (not shown) which may route information to a third party. Service monitor 226 may be provided for a service technician to exchange information and instructions with CPU 222.

USB port 230 may optionally be included in self-service device 200. USB port 230 may be configured to receive a USB jack. The USB jack may be connected to a fingerprint scanner. The fingerprint scanner may receive biometric information from a user. USB port 230 may receive the biometric information from the fingerprint scanner and transmit the information to CPU 222.

Figure 3:
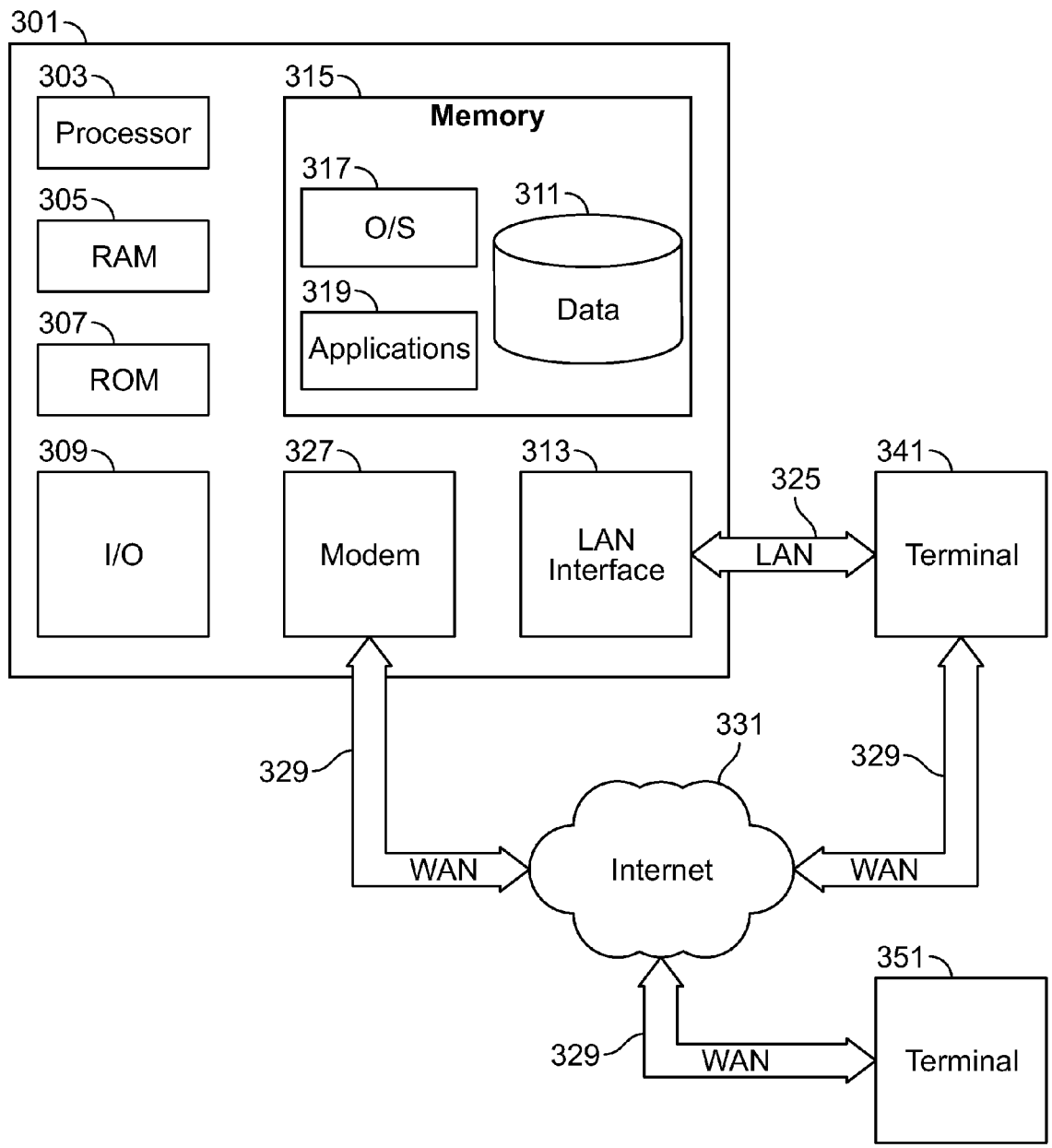
FIG. 3 shows apparatus that may be used in accordance with the principles of the invention.

FIG. 3 is a block diagram that illustrates a generic computing device 301 (alternatively referred to herein as a "server" or "computer") that may be used according to an illustrative embodiment of the invention. It should be noted that computing device 301 may illustrate apparatus included in ATM CPU 222 (shown in FIG. 2), the ATM server, the PIN processor and/or the matching algorithm.

The computer server 301 may have a processor 303 for controlling overall operation of the server and its associated components, including RAM 305, ROM 307, I/O module 309, and memory 315.

I/O module 309 may include a microphone, keypad, touch screen, and/or stylus through which a user of server 301 may provide input, and may also include one or more of a speaker for providing audio output and a video display device for providing textual, audiovisual and/or graphical output. Software may be stored within memory 315 and/or computer storage to provide instructions to processor 303 for enabling server 301 to perform various functions. For example, memory 315 may store software used by server 301, such as an operating system 317, application programs 319, and an associated database 311. Alternatively, some or all of server 301 computer executable instructions may be embodied in hardware or firmware (not shown).

Server 301 may operate in a networked environment supporting connections to one or more remote computers, such as terminals 341 and 351. Terminals 341 and 351 may be personal computers or servers that include many or all of the elements described above relative to server 301. The network connections depicted in FIG. 3 include a local area network ("LAN") 325 and a wide area network (WAN) 329, but may also include other networks (not shown). When used in a LAN networking environment, computer 301 is connected to LAN 325 through a network interface or adapter 313. When used in a WAN networking environment, server 301 may include a modem 327 or other means for establishing communications over WAN 329, such as Internet 331. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application programs 319, which may be used by server 301, may include computer executable instructions for invoking user functionality related to communication, such as email, short message service (SMS), and voice input and speech recognition applications.

Computing device 301 and/or terminals 341 or 351 may also be mobile terminals including various other components, such as a battery, speaker, and antennas (not shown). Terminal 351 and/or terminal 341 may be portable devices such as a laptop, cell phone, Blackberry™, or any other suitable device for storing, transmitting and/or transporting relevant information.

Any suitable information may be stored in memory 315.

One or more of applications 319 may include one or more algorithms that may be used to diagnose faults, analyze data sets, parse electronic logs and/or any other suitable tasks related to end-to-end self-service device analysis.

It should be noted that the invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

It should additionally be noted that the invention may be described in the general context of computer-executable instructions, such as program modules, being executed by a computer. Generally, program modules include routines, programs, objects, components, data structures, and the like, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 4:
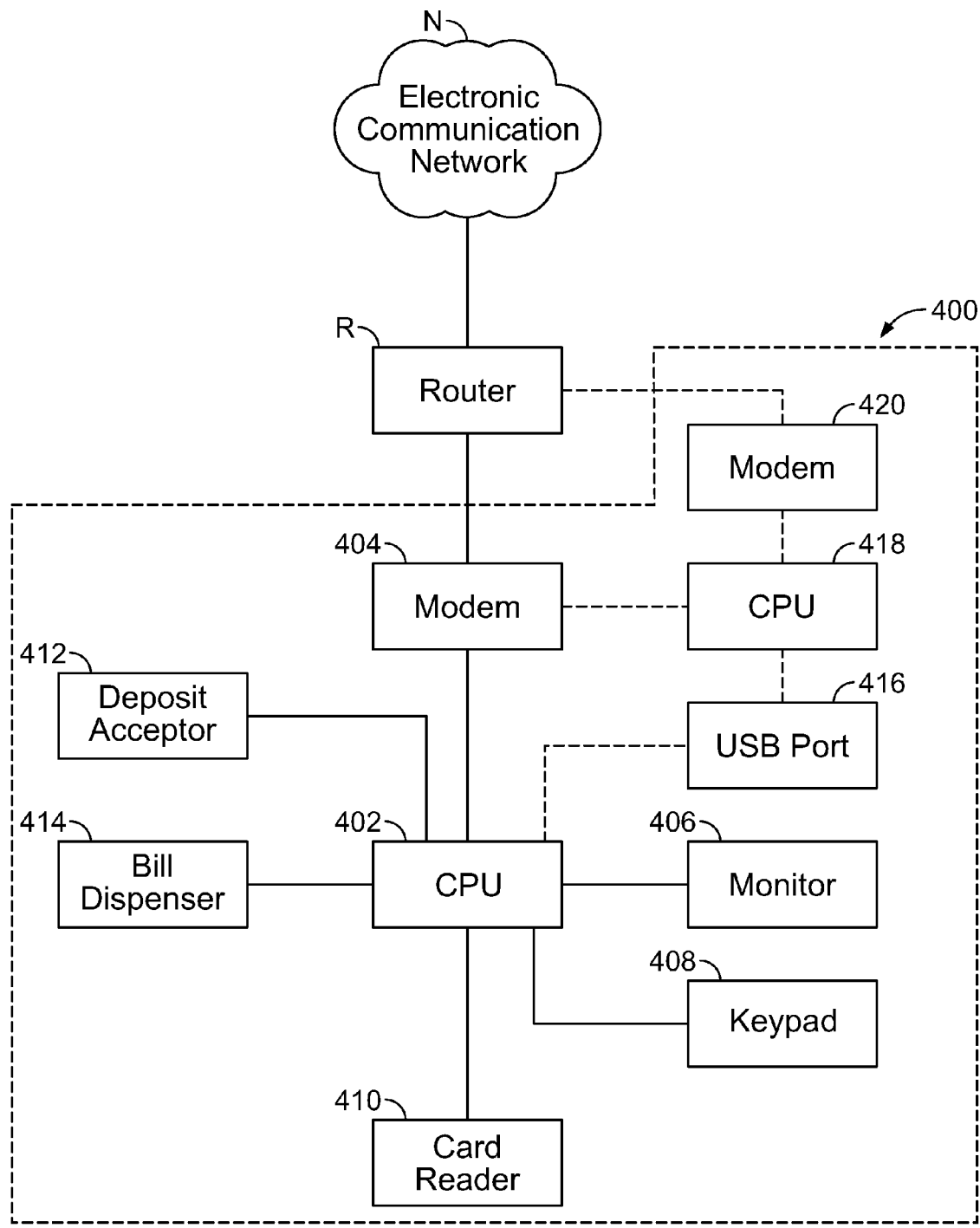
FIG. 4 shows a schematic diagram of hardware apparatus for use according to the principles of the invention.

FIG. 4 shows control system 400 for controlling a self-service device such as 100 or 200 (shown, respectively, in FIGS. 1 and 2). System 400 may be controlled by CPU 402. CPU 402 may be a generic computing device such as generic computing device 301 (shown in FIG. 3). CPU 402 may receive information from a customer via monitor 406, keypad 408, card reader 410 and deposit acceptor 412. CPU 402 may exchange the information with electronic communication network N via modem 404, which is in communication with router R. CPU 402 may dispense bills through bill dispenser 414.

FIG. 4 may include USB Port 416. USB Port 416 may be in electronic communication with CPU 402 and/or CPU 418. CPU 418 may be in electronic communication with Modem 404 and/or Modem 420. Modem 420 may be in electronic communication with Router R.

USB Port 416 may be removably connected to a user's fingerprint scanner. The user's fingerprint scanner may receive user biometric information. In the event that user biometric information is received by the fingerprint scanner, the biometric information may be transmitted via USB Port 416.

In the embodiments in which USB Port 416 is in electronic communication with CPU 418, CPU 418 may receive biometric information from USB Port 416 and filter the received data. The filtering may ensure that the received data is in compliance with one or more predetermined protocols. In the event that the data is determined to be out of compliance with the predetermined protocols (s), CPU 418 may substantially immediately delete the received data.

In the event that the data is in compliance with the predetermined formats, CPU 418 may encrypt the data and transfer the encrypted data to either Modem 404 or Modem 420. Modem 404 or Modem 420 may subsequently transfer the data through Router R to Electronic Communication Network N.

In the embodiments in which USB Port 416 is in electronic communication with CPU 402, CPU 402 may receive biometric information from USB Port 416. Upon receipt, CPU 402 may filter the received data. The filtering may ensure that the received data is in compliance with one or more predetermined protocols. In the event that the data is determined to be out of compliance with the predetermined protocols (s), CPU 402 may substantially immediately delete the received data.

In the event that the data is in compliance with the predetermined formats, CPU 416 may encrypt the data and transfer the encrypted data to Modem 404. Modem 404 may subsequently transfer the data through Router R to Electronic Communication Network N.

Figure 5:
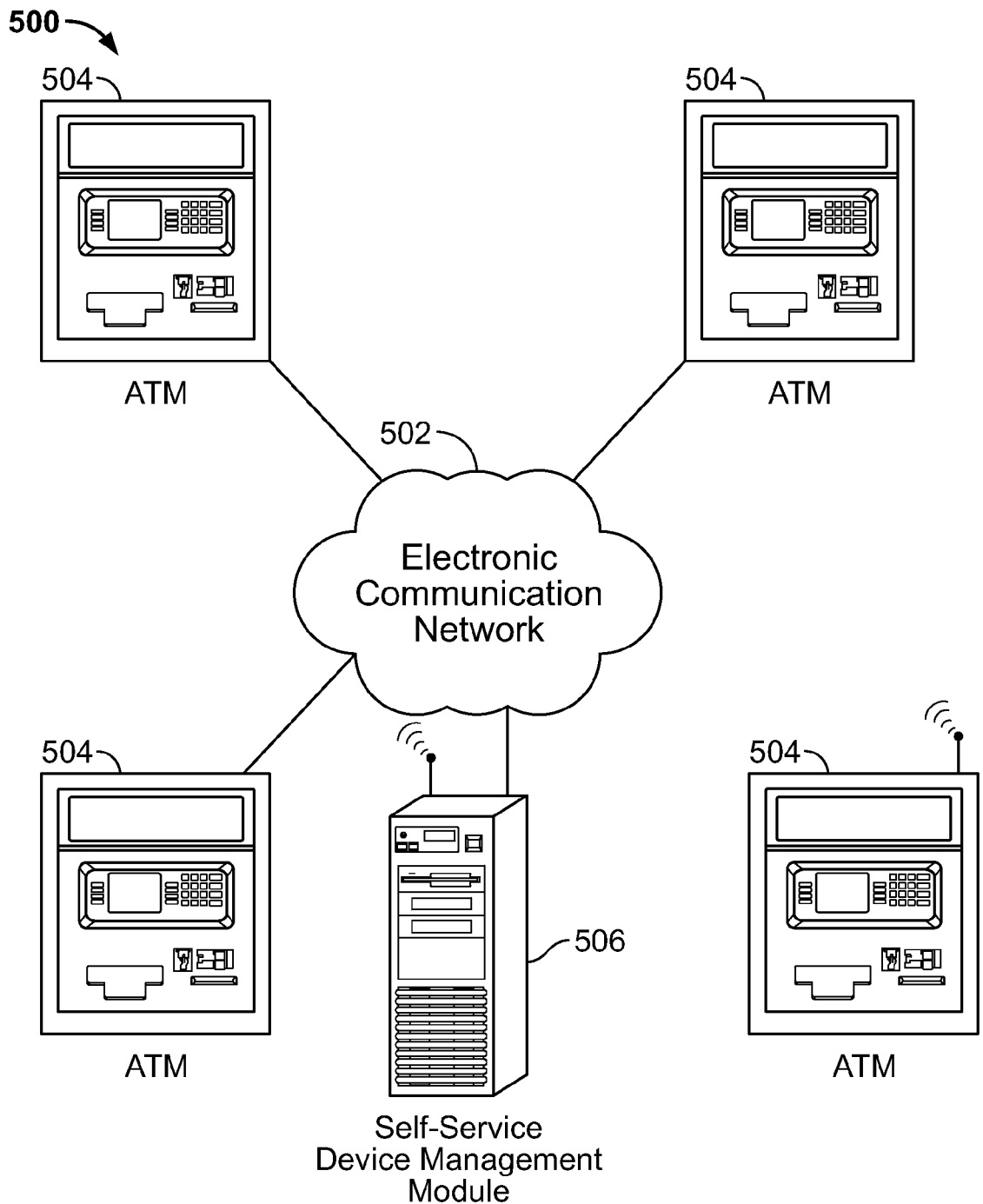
FIG. 5 shows a schematic diagram of a network for use according to the principles of the invention.

FIG. 5 shows illustrative transaction information network 500. Transaction information network 500 may include electronic communication network 502. Network 502 may be in part a LAN or WLAN, a WAN or WLAN or any other suitable network. Network 502 or portions thereof may be cabled, wired, optical fibered or wireless.

Self-service devices such as ATMs 504 may communicate via electronic communication network 502 with self-service device management module 506. A remote user may use self-service device management module 506 to monitor, control, reset, repair and/or intervene in one or more processes of ATMs 504.

Figure 6:
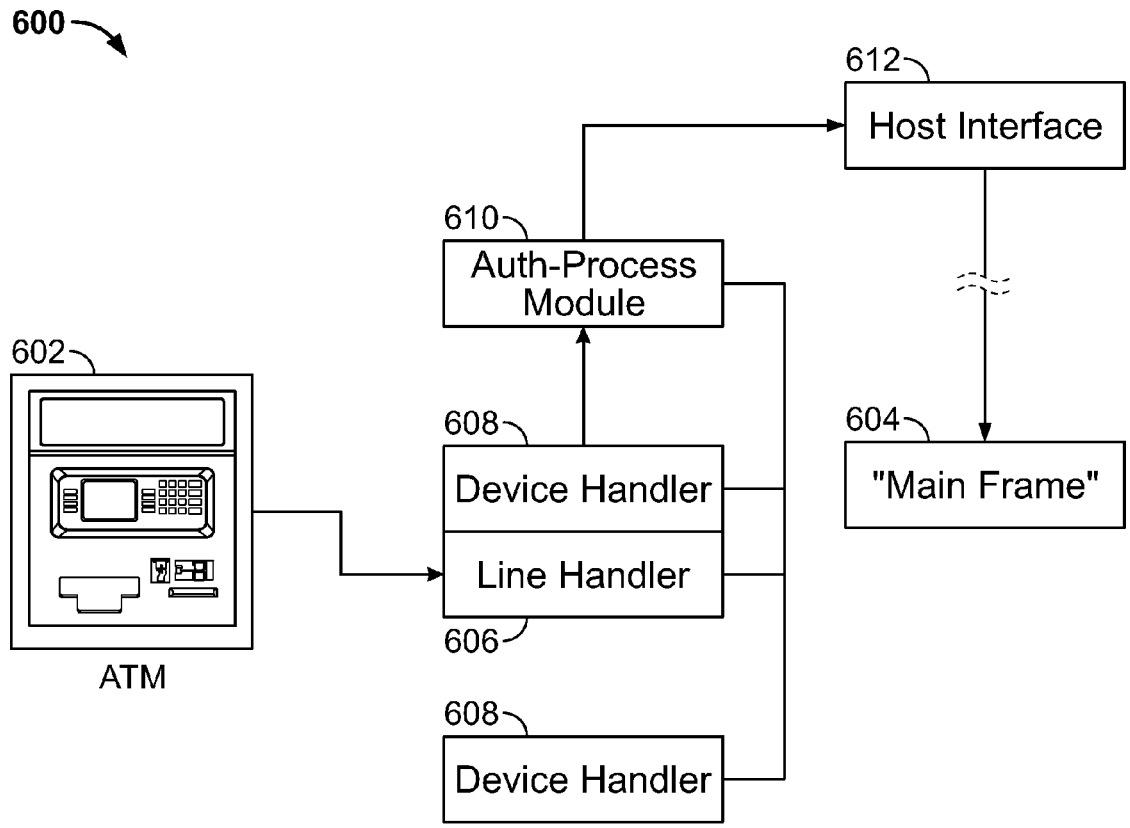
FIG. 6 shows a schematic diagram of another apparatus for use according to the principles of the invention.

FIG. 6 shows illustrative portions of communication system 600 for exchanging transaction information between ATM 602 and financial institution transactional platform 604. ATM 602 may be an ATM such as 100 or 200 (shown respectively in FIGS. 1 and 2). Transactional platform 604 may be any suitable device for settlement and clearing of transactions. For example, platform 604 may be a financial institution mainframe.

Command lines in transactional information from ATM 602 may be executed at line handler protocol layer 606. Device handler 608 may handle routing decisions based on transactional information requirements for authorization, settlement, clearance, transactional networks and issuing financial institutions. Authorization requests may then be processed by auth-process module 610. Auth-process module 610 may then provide transactional information to host interface 612 for communication with platform 604.

A supervisory module (not shown) may receive diagnostic data from line handler 606, device handler 608, auth-process module 610, or any other suitable source. The diagnostic data may be used to manage ATM 602. The diagnostic data may be provided to a self-service management module such as 506 (shown in FIG. 5).

Figure 7:
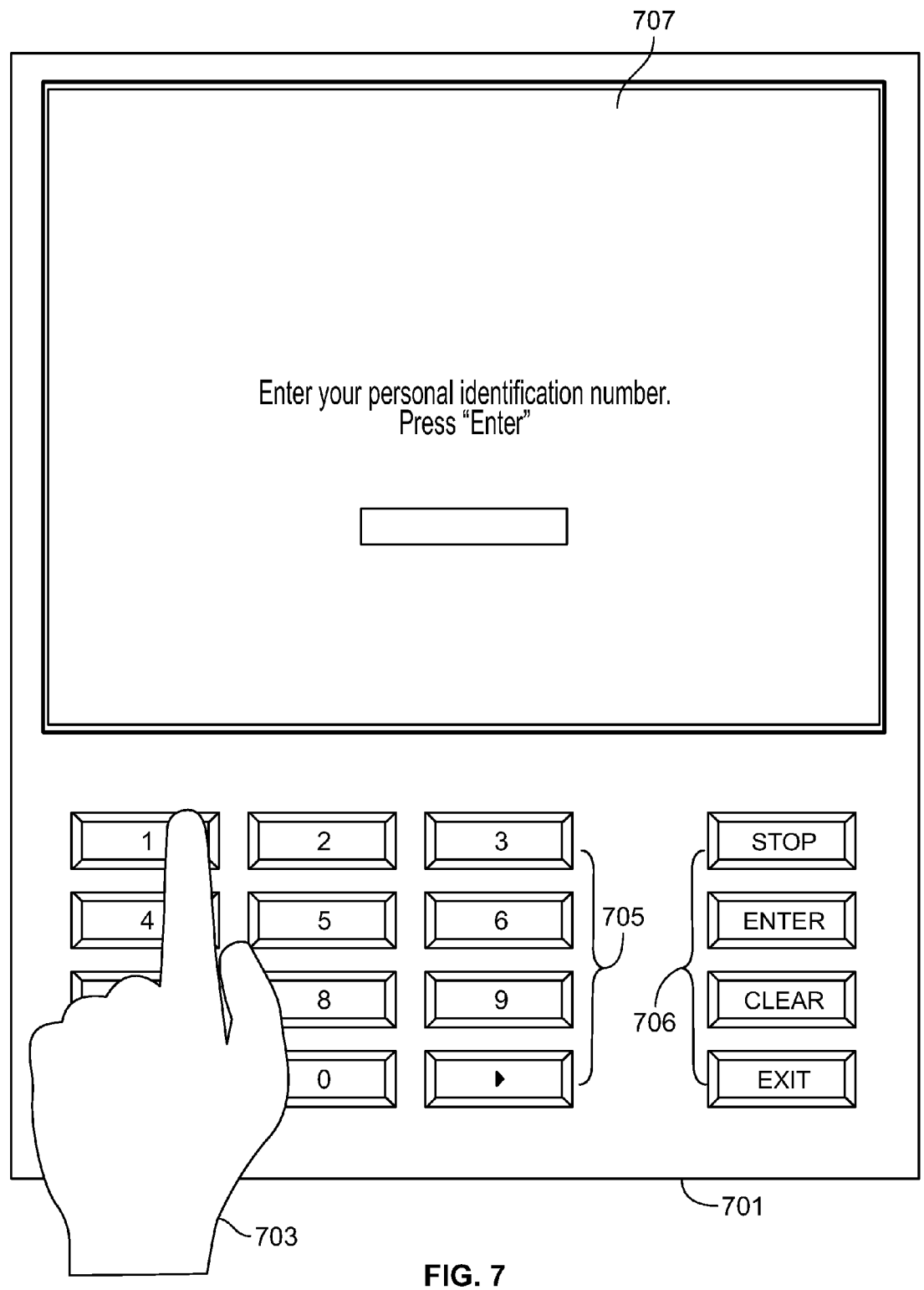
FIG. 7 shows a banking customer inputting information into an ATM using a keypad.

FIG. 7 shows an illustrative method of a banking customer 703 utilizing a keypad to select inputs for information entry into an ATM 701. In FIG. 7, the banking customer 703 selects inputs by applying pressure to a button marked with the desired input. Inputs displayed on a keypad may include numeric input keys 705 and functional input keys 706.

Figure 8A:
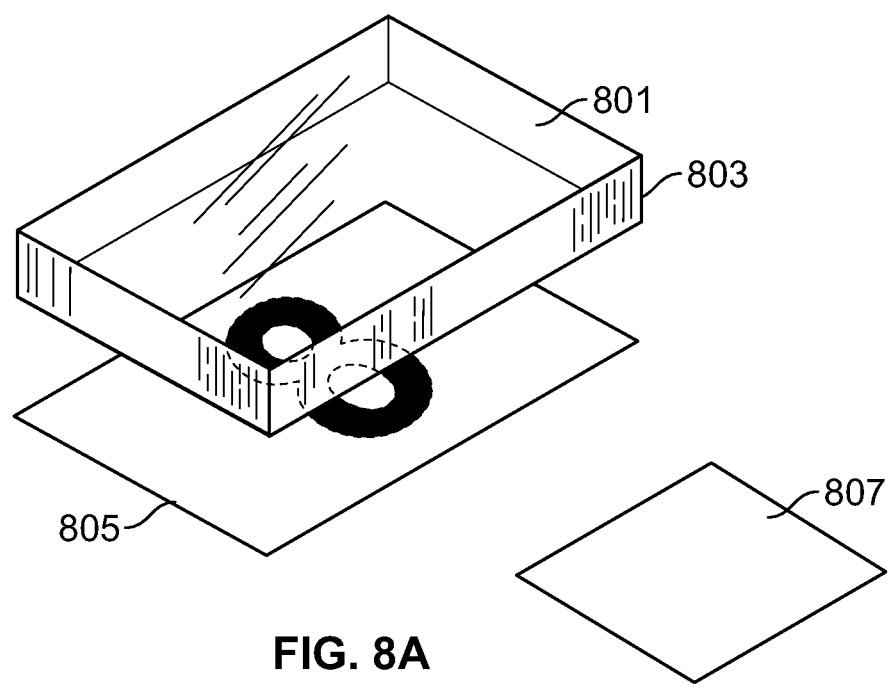
FIGS. 8A-8F show various embodiments of a display screen and one or more fingerprint scanners.

FIG. 8A shows an illustrative display screen and a fingerprint scanner. The illustrative display screen may include screen 805. Display screen 805 may be configured to display one or more numbers to a banking customer. In some embodiments, the illustrative display screen may also include transparent surface 801. Display screen 805 may be visible through transparent surface 801.

In some embodiments, offsetting screen 805 from transparent surface 801 may cause side wall 803 to form a tunnel that restricts the viewing angle of numbers displayed by screen 805. The tunnel side walls may prevent viewing of the displayed keys from a side or particular angular views. Only a planar view substantially parallel to the key surface may allow the display to be viewed. This restriction of the viewing angle may provide an added level of security in preventing unauthorized viewing of the numbers displayed by the display screens. Embodiments of displays with narrow viewing angles are described more fully in co-pending, commonly-assigned, U.S. patent application Ser. No. 12/825,522, filed on Jun. 29, 2010 which is hereby incorporated herein by reference in its entirety.

It should be noted that, in some embodiments of the invention, each of transparent surface 801 and side wall 803 may or may not be included in the display screen according to the invention.

Figure 8B:
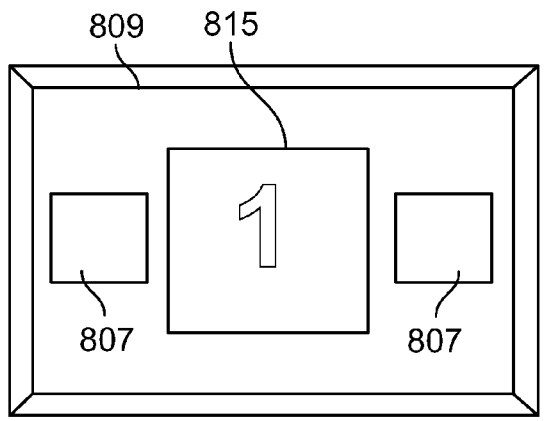

FIG. 8B shows illustrative key 809 that may be included in an ATM in accordance with the systems and methods of the invention. Key 809 may replace one or more of numeric input keys 705 and/or functional input keys 706 (shown in FIG. 7) included in a typical ATM. Key 809 may include one or both of fingerprint scanners 807 and display screen 815.

In some embodiments, a user may place a fingerprint on one of fingerprint scanners 807 to select the number displayed in display screen 815. In some embodiments, a user may place a different finger on each of fingerprint scanners 807 to select the number displayed in display screen 815. In some embodiments, the user may depress key 809 while placing his finger(s) on scanner(s) 807 in order to select the number displayed. It should be noted that fingerprint scanners 807 are examples of fingerprint scanners that are proximal to and associated with a display screen.

Figure 8C:
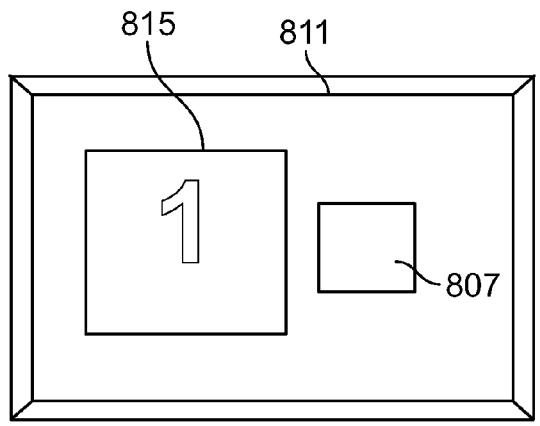

FIG. 8C shows illustrative key 811 that may be included in an ATM in accordance with the systems and methods of the invention. Key 811 may replace one or more of numeric input keys 705 and/or functional input keys 706 included in a typical ATM. Key 811 may include fingerprint scanner 807 and display screen 815. In FIG. 8C, a user may place a fingerprint on fingerprint scanner 807 to select the number displayed in display screen 815. In some embodiments, the user may depress key 809 while placing his finger on scanner 807.

It should be noted that, for illustrative keys 809 and 811, in the event that a user does not desire to input biometric information into the ATM and/or if the ATM is unable to receive and/or validate biometric information, the fingerprint scanners may be temporarily disabled. After the scanners are disabled, the user may select a number by simply depressing the key (809/811) that displays the desired number.

Figure 8D:
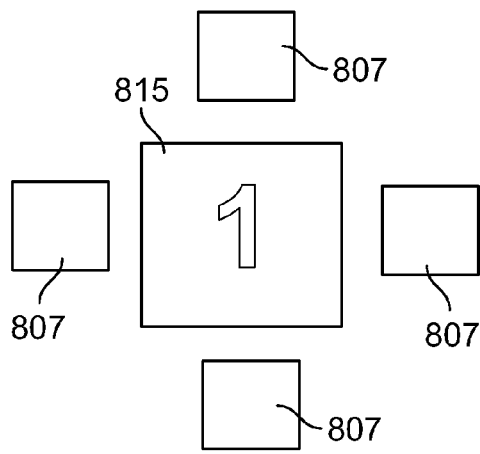

FIG. 8D shows display screen 815 and fingerprint scanners 807. Display screen 815 and one or more of fingerprint scanners 807 may be included in an ATM in accordance with the systems and methods of the invention. In some embodiments, a user may select a number displayed on display screen 815 by placing a finger on one of fingerprint scanners 807. In some embodiments, a user may place a different finger on two or more of fingerprint scanners 807 to select the number displayed in display screen 815. It should be noted that fingerprint scanners 807 are examples of fingerprint scanners that are proximal to and associated with a display screen.

Figure 8E:
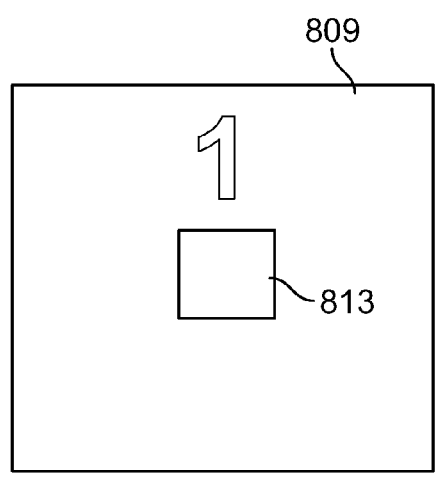

FIG. 8E shows fingerprint scanner 813 embedded in screen 809. Screen 809 may be a computer screen, a touch screen, a screen on a mobile phone, a screen on a tablet, or any other suitable screen. In FIG. 8E, a user may select a number displayed on screen 809 by placing his finger on a fingerprint scanner located proximal to the displayed number. For example, in the event that a user desires to select the number '1,' the user may place his finger on fingerprint scanner 813.

Figure 8F:
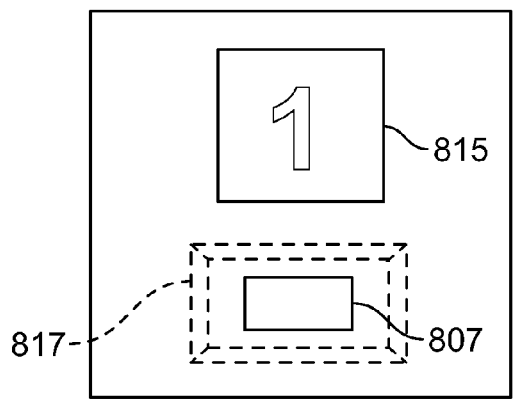

FIG. 8F shows display screen 815 and fingerprint scanner 807. In FIG. 8F, fingerprint scanner 807 is included on depressible key 817. In FIG. 8F, as user may select a number displayed on display screen 815 by placing his finger on fingerprint scanner 807. In FIG. 8F, the user may also depress key 817 to select the number displayed on display screen 815.

Figure 9:
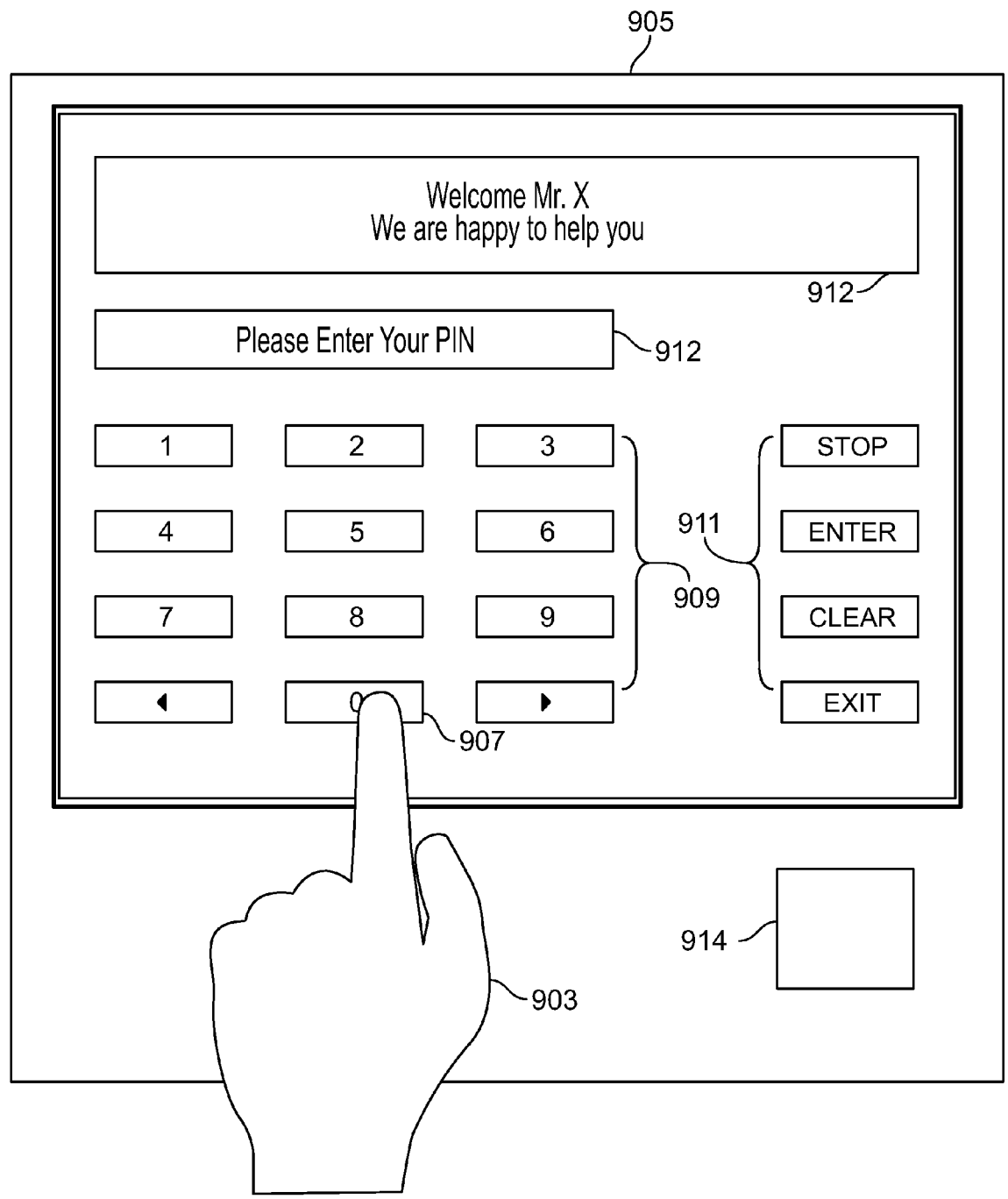
FIG. 9 shows a banking customer inputting information into an ATM using a touch screen.

FIG. 9 shows an illustrative method of banking customer 903 utilizing touch screen 905 to select inputs for information entry into an ATM. Inputs displayed may include numeric inputs 909 and/or functional inputs 911. The touch screen 905 may display additional information 912. In FIG. 9, the banking customer 903 may select inputs by touching displayed choices. Touch screen 905 may detect the presence and location of a customer's "touch" within the display area. In FIG. 9 the banking customer 903 is shown selecting an input 907 representing the number zero.

Figure 17:
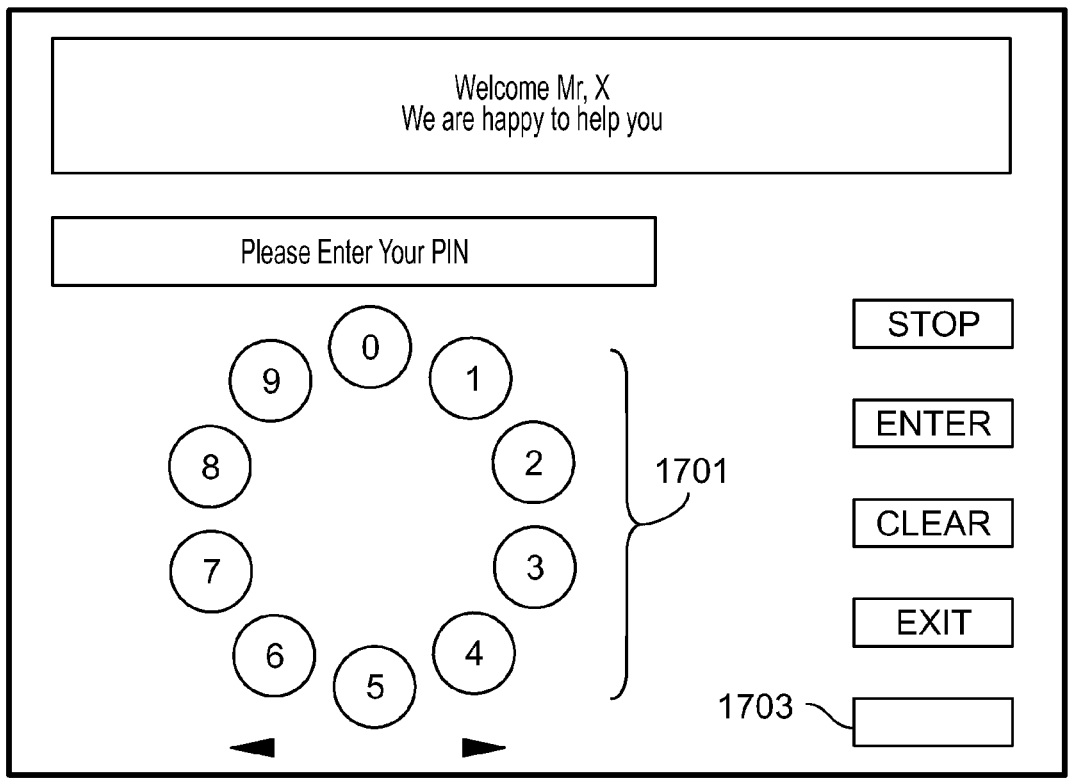
FIG. 17 shows a dynamic display of keys presented in a non-conventional pattern.
Figure 18:
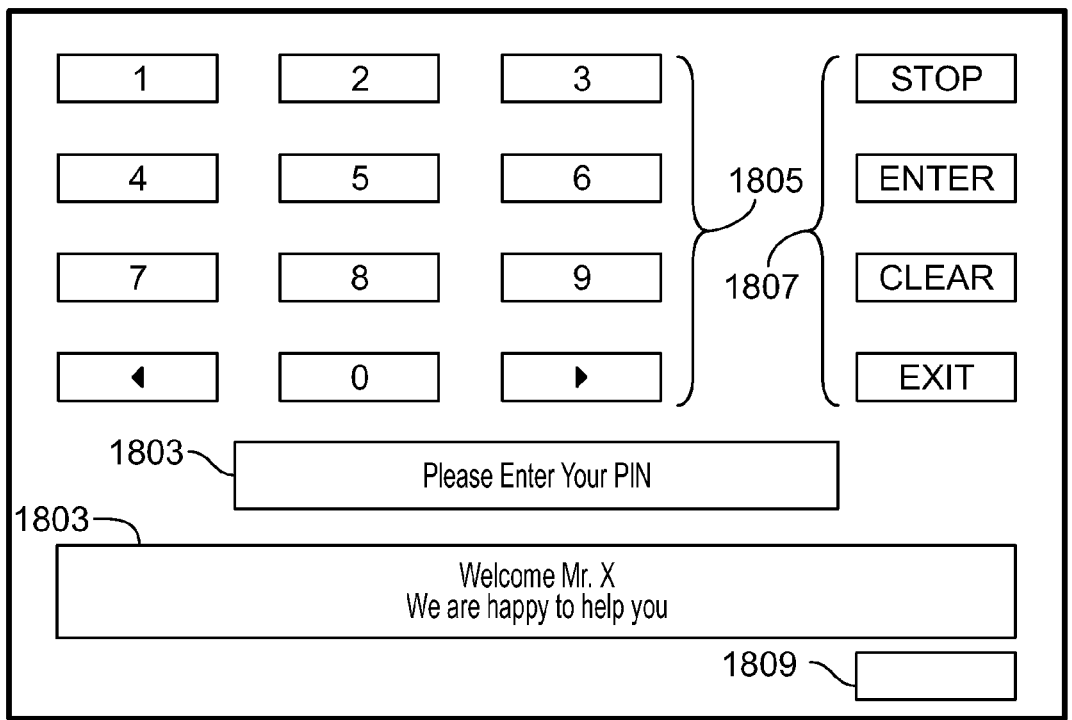
FIG. 18 shows a dynamic display based on shifting off-center with respect to the overall display the position of the displayed inputs.

In the systems and methods of the invention, touch screen 905 may display a conventional layout of the numbers 1-9 and/or a randomized display of numbers 1-9. Exemplary randomized layouts that may be displayed by a touch screen such as touch screen 905 are illustrated in FIGS. 17 and 18.

In the event that a user desires to initiate a banking session, the user may enter customer identification information. Subsequently, the user may enter his PIN. In some embodiments, the user may be required to touch fingerprint scanner 914 after each selection of a number included in his PIN number. The user may touch fingerprint scanner 914 using one or more of the fingerprint sequences described herein.

In these embodiments, the ATM may store and transmit information relating to each number selected and the biometric information received after the selection of each of the numbers. The ATM server may subsequently validate the biometric information received and the numbers selected.

It should be noted that, in some embodiments, fingerprint scanner 914 may be integrated into touch screen 905 and/or an ATM that includes touch screen 905. In other embodiments, fingerprint scanner 914 may be physically secured to ATM 914 in a secured location inaccessible to an ATM user and transmit information to and from the ATM using a USB connection.

In some embodiments, fingerprint scanner 914 may be removably coupled to the ATM using a USB port. In these embodiments, a user may input a suitable USB jack into the USB port. The user may then touch the USB-coupled fingerprint sensor with his finger(s) after inputting each of his PIN numbers. The ATM may receive user biometric information through the USB port and subsequently transmit at least a portion of the received information to the ATM server.

It should be noted that the information received via the USB port may be packaged securely prior to entering the ATM. Additionally, the information may be stored in a memory separate from the operational memory of the ATM. The information may then be encrypted and transmitted to the ATM server upon receipt of the user PIN numbers. The information may be transmitted to the ATM without passing through, or being accessible by, the ATM CPU.

It should additionally be noted that the USB port may receive only one or more specific USB jacks. In some embodiments, a user may be required to purchase, or be provided with, a USB compatible with the ATM from one or more banks affiliated with the ATM.

Figure 10:
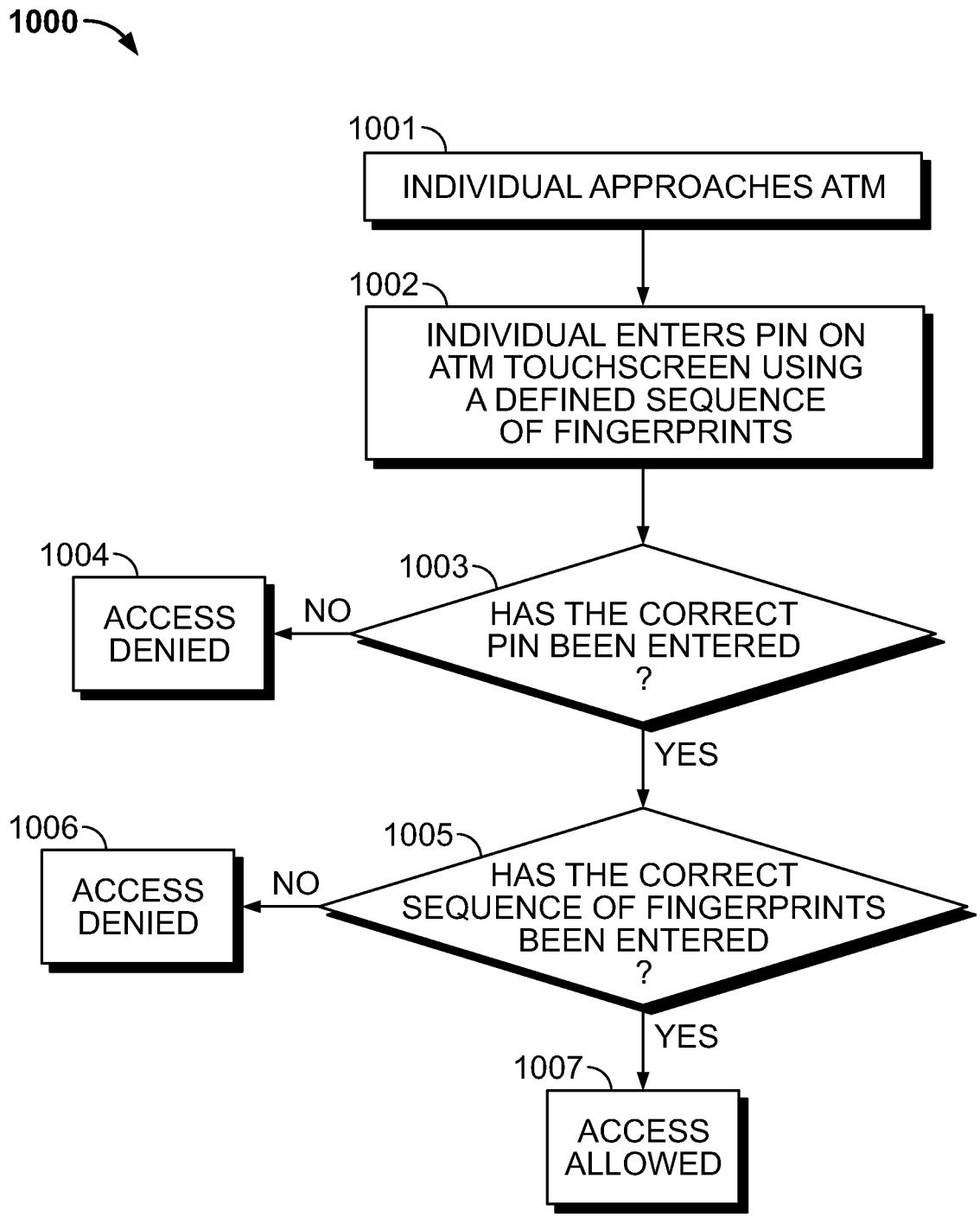
FIG. 10 shows a flow diagram of steps according to the systems and methods of the invention.

FIG. 10 shows illustrative process 1000. Illustrative process 1000 includes steps that may be performed in some embodiments of the invention. At step 1001 an individual approaches an ATM. At step 1002, the individual enters a PIN on an ATM touch screen using a defined sequence of fingerprints. After entering the PIN and sequence of fingerprints, the information may be transmitted by the ATM to an ATM server.

At step 1003 the ATM server determines whether the correct PIN has been entered. This determination may be executed by the PIN processor. At step, 1004, if the entered PIN is determined to be incorrect, access is denied. At step 1005, if the entered PIN is determined to be correct, the ATM server determines if the correct sequence of fingerprints has been entered. This determination may be executed by the matching algorithm. At step 1006, if the sequence of fingerprints entered does not match a stored template of fingerprints, access is denied. At step 1007, if the sequence of fingerprints entered does match a stored template of fingerprints, access is allowed.

Figure 11:
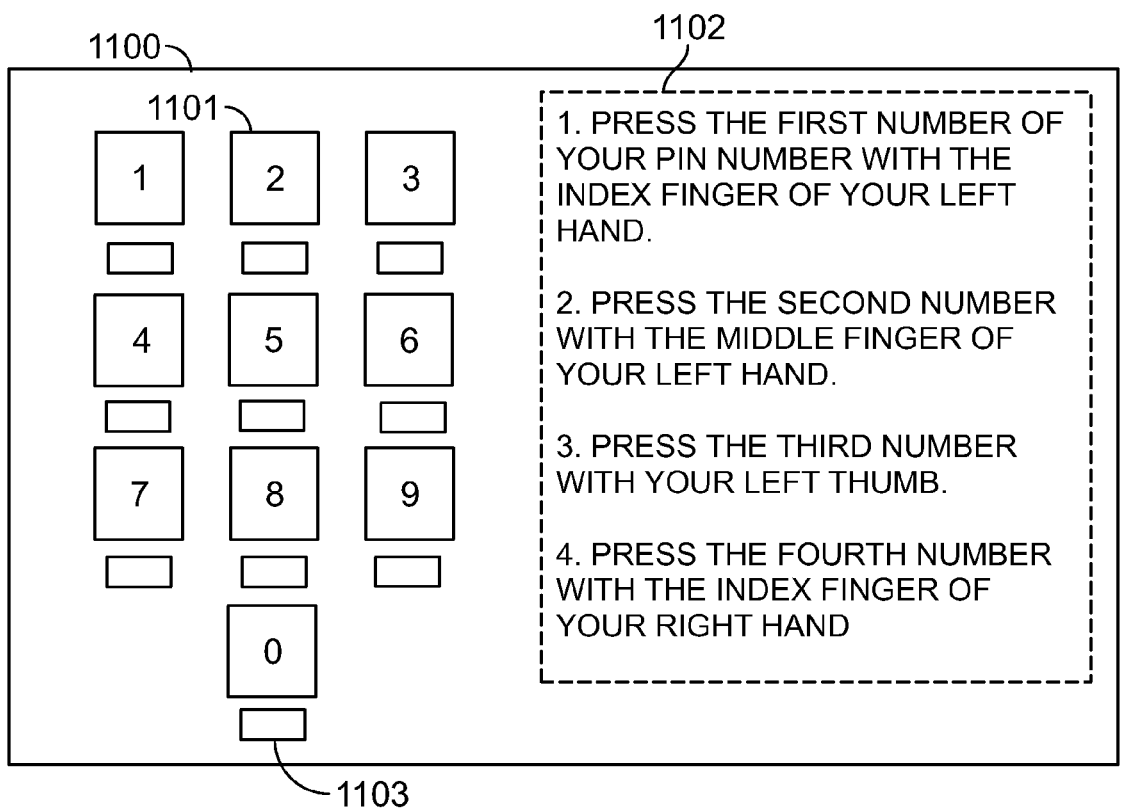
FIG. 11 shows a display of an illustrative sequence of fingerprints for user authentication to be used in conjunction with a dynamic display of inputs available for selection.

FIG. 11 shows illustrative ATM portion 1100 that may be included in an ATM in accordance with the invention. Illustrative ATM portion 1100 may include display screens 1101, fingerprint scanner(s) with the predetermined formats 1103 and instructions 1102. Although display screens 1101 display a conventional numeric layout, it should be noted that display screens 1101 may be configured to display any randomized layout of numbers included in the systems and methods of the invention.

Instructions 1102 may include a sequence of fingerprints to be used by a user while selecting his PIN. In some of these embodiments, information relating to the sequence of fingerprints may be transmitted to the ATM server upon receipt of an ATM PIN. The matching algorithm may then use the information relating to the sequence of fingerprints to select the stored template(s) to be used in verifying input biometric information.

Although instructions 1102 are displayed on the ATM in FIG. 11, in other embodiments of the invention instructions 1102 may be electronically transmitted to an ATM user by e-mail, text, or displayed on a user banking page. In these embodiments, instructions 1102 may not be displayed on an ATM. Rather, the user may be required to remember his fingerprint sequence or store his sequence in a location accessible to him prior to initiating a banking transaction. In other embodiments, the sequence of fingerprints may be transmitted to the user by e-mail or text after input of his banking card or other user identification information into the ATM.

Figure 12:
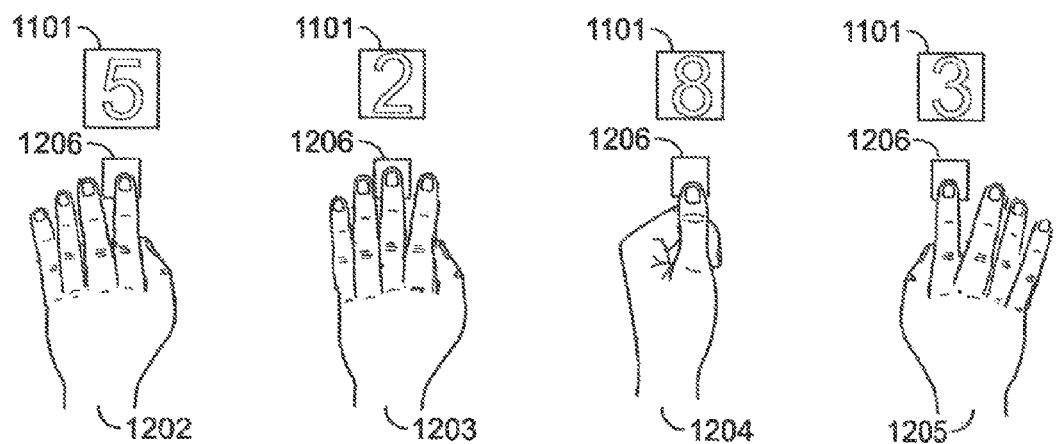
FIG. 12 shows an illustrative sequence of fingerprints for user authentication.

FIG. 12 shows an illustrative sequence of fingerprints used by a user to select his PIN in accordance with the systems and methods of the invention. In FIG. 12, a user with PIN '5283' is inputting his PIN by touching fingerprint scanners 1206 using a fingerprint sequence. It should be noted that, in FIG. 12, the user is inputting his PIN using the fingerprint sequence defined in instructions 1102 included in FIG. 11. Specifically, the user is using the fingerprint sequence of index finger of left hand 1202, middle finger of left hand 1203, left thumb 1204 and index finger of right hand 1205 to select his displayed PIN numbers.

Figure 13:
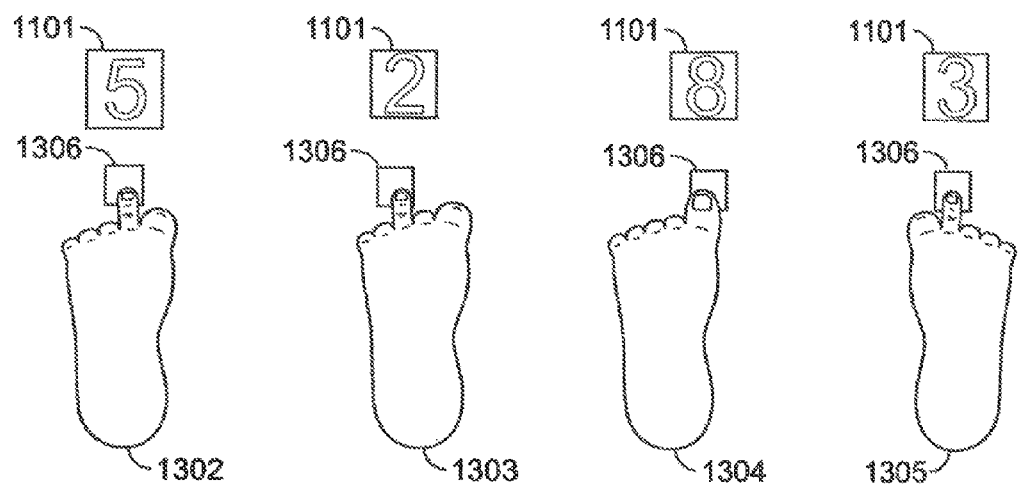
FIG. 13 shows an illustrative sequence of prints of the digits of the foot for user authentication.

FIG. 13 shows an illustrative sequence of prints of digits of the foot used by a user to select his PIN in accordance with the systems and methods of the invention. In FIG. 13, a user with PIN '5283' is inputting his PIN by touching scanners 1306 using a sequence of prints of digits of the foot. Specifically, the user is using the sequence of index digit of left foot 1302, middle digit of left foot 1303, right-most toe of left foot 1304 and index digit of right foot 1305 to select his displayed PIN numbers. It should be noted that scanners 1306 that are receiving the biometric information may be located at the ATM in a location that accommodates the input of the prints of digits of one or more feet.

Figure 14:
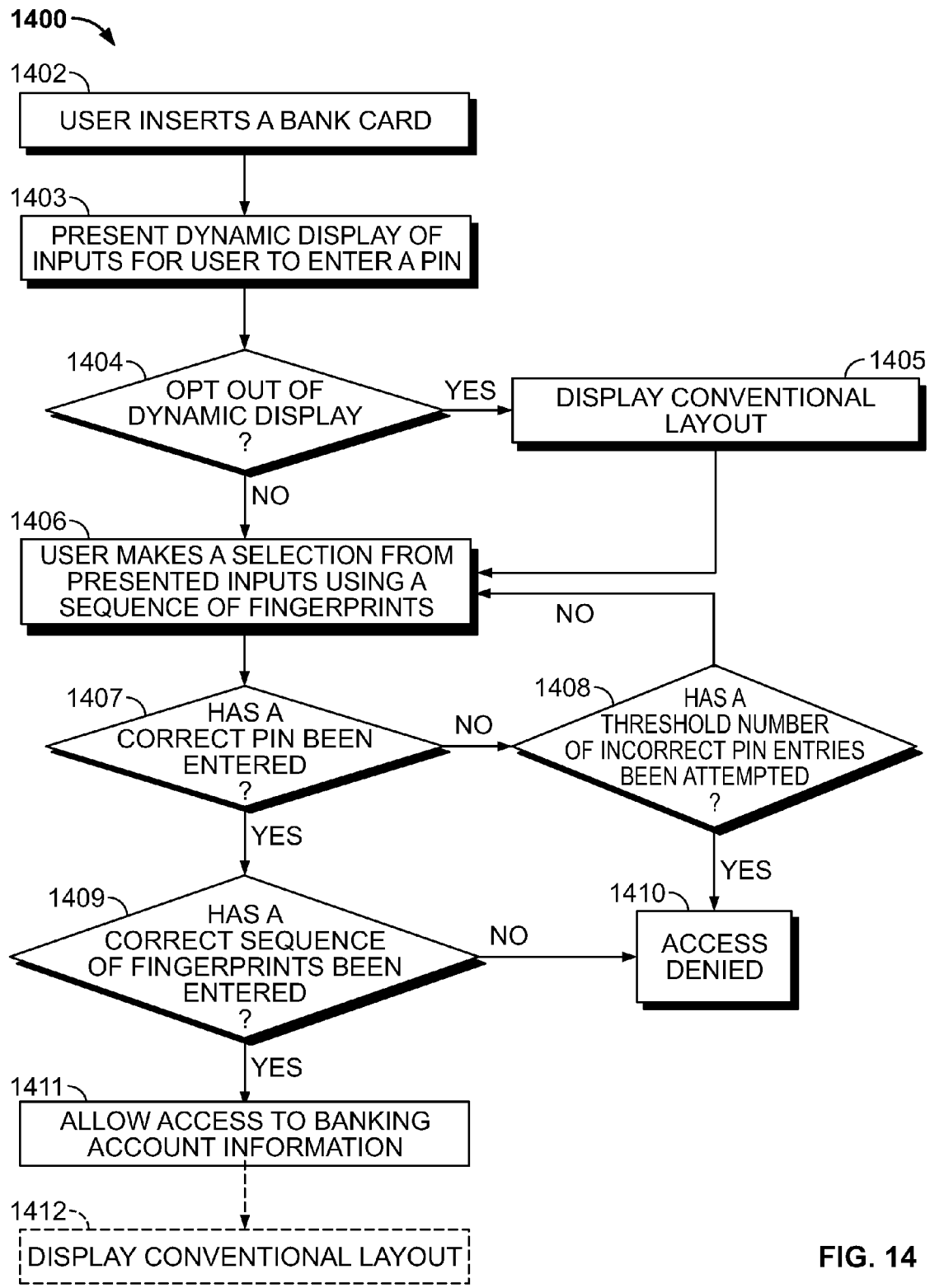
FIG. 14 shows a flow diagram of steps according to the systems and methods of the invention.

FIG. 14 shows illustrative process 1400. Illustrative process 1400 includes steps that may be performed by the ATM, the ATM server, the PIN processor and/or the matching algorithm, either alone or in combination with one or more of the other listed devices, in accordance with the systems and methods of the invention.

At step 1402, a user or banking customer may insert a bank card into an ATM. Following insertion of the bank card, at step 1403 the ATM may display to the user a dynamic display of inputs for the user to use while entering his PIN. For example, the dynamic display may be a randomized display of the numbers 1-9 or a non-conventional pattern of presentation of the numbers 1-9.

At step 1404, the user may be presented with an option to opt-out of the dynamic display. If the user executes a selection indicating his desire to opt-out of the dynamic display, at step 1405 the display screens may display a conventional layout. If the user does not execute a selection to opt-out of the dynamic display, the user may select his PIN from the dynamic display using a sequence of fingerprints at step 1406.

At step 1407, a PIN processor may determine if a correct PIN has been entered. In the event that the PIN processor determines that an incorrect PIN has been entered, the ATM or PIN processor may determine at step 1408 if a threshold number of incorrect PIN entries has been attempted. If the PIN processor or ATM determines that the threshold number of incorrect PIN entries has not been met and/or exceeded, the user may again be presented with a randomized selection of inputs at step 1406. If the PIN processor or ATM determines that the threshold number of incorrect PIN entries has been met and/or exceeded, the ATM may deny access to the user at step 1410.

In the event that the PIN processor determines that a correct PIN has been entered, a matching algorithm may determine at step 1409 if a correct sequence of fingerprints has been entered. If the matching algorithm determines that the correct sequence of fingerprints has not been entered, ATM access may be denied to the user at step 1410. If the matching algorithm determines that the correct sequence of fingerprints has been entered, the ATM may allow user access to banking account information at step 1411. In some embodiments, after the granting of access, the display screens may display a conventional layout at step 1412.

Figure 15:
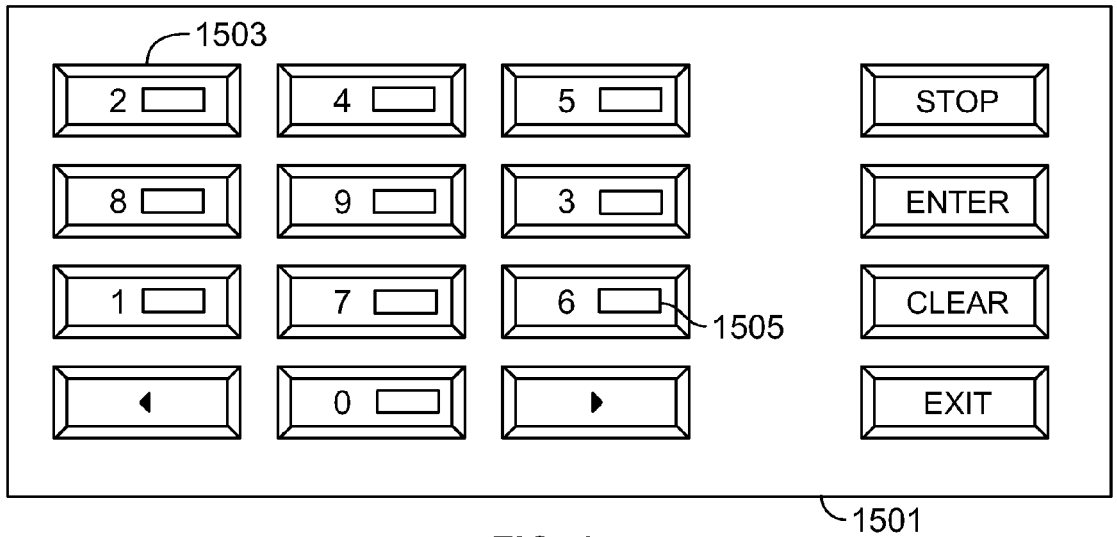
FIG. 15 shows a diagram of a dynamic display of numeric inputs.

FIG. 15 shows illustrative ATM portion 1501. Illustrative ATM portion 1501 may be included on an ATM in accordance with the systems and methods of the invention. Illustrative ATM portion 1501 includes key(s) 1503 and fingerprint scanner(s) 1505. A user inputting his PIN using illustrative ATM portion 1501 may select each of his PIN numbers by touching the fingerprint scanners associated with his PIN numbers. The user may also depress the key associated with his PIN numbers during the input of the biometric information.

Figure 16:
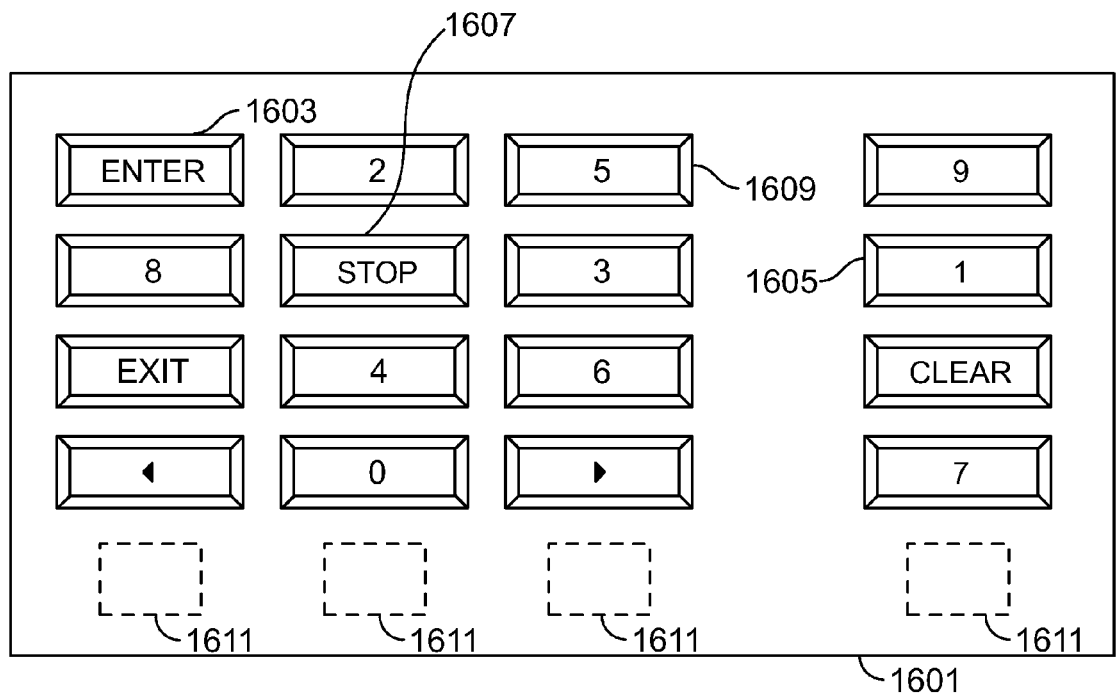
FIG. 16 shows a dynamic display of numeric and functional inputs.

FIG. 16 shows illustrative ATM portion 1601. Illustrative ATM portion 1601 may be included on an ATM in accordance with the systems and methods of the invention. Illustrative ATM portion 1601 includes multiple depressible keys.

A user inputting his PIN using illustrative ATM portion 1601 may select one of his PIN numbers by depressing the key that displays his PIN number. After the depression of the appropriate key, the user may subsequently touch one of fingerprint scanners 1611. The user may use this pattern of (1) selecting a PIN number and (2) subsequently touching a fingerprint scanner while inputting of each of his PIN numbers. In these embodiments, a receiver may electronically associate each fingerprint input into the scanner with a PIN number selected prior to the receipt of the input fingerprint. The matching algorithm may use this information to determine the appropriate template to use when validating the input fingerprint(s).

In some embodiments, the user may touch any one of scanners 1611 after the depression of a key. In these embodiments, one or more of scanners 1611 may be included in illustrative ATM portion 1601.

In other embodiments, after depressing a key, the user may be required to touch a fingerprint scanner located in the same row as the row in which he depressed the key. For example, a user selecting the key 1609 may be required to subsequently touch fingerprint scanner 1611 located in the same row as key 1606. In some of these embodiments, each of fingerprint scanners 1611 may be included in illustrative ATM portion 1601.

In FIG. 16, the positions of functional inputs, in addition to the positions of numeric inputs, are randomized. Specifically, enter function 1603 is displayed in a position that conventionally displays the number one, as opposed being displayed among functional inputs 1605. Additionally, stop function 1607 is displayed in a position that conventionally displays the number five.

It should be noted that, in some embodiments of the invention, all keys presented for user selection, including functional keys, may be dynamically displayed by the display screens.

FIG. 17 shows another dynamic display of an illustrative non-conventional pattern of presentation of inputs available for a user to select. The dynamic display may be displayed on an ATM touch screen.

FIG. 17 shows the numeric inputs displayed in an oval shape 1701. Although the sequential order of the numbers displayed has not been changed, the pattern of the presentation alters the appearance of the presented inputs from a conventional layout. Each customer may be presented with a pattern randomly chosen from a set of defined patterns (not shown). Varying the different patterns presented preferably makes more difficult, for a thief, mapping hand movements to inputs selected.

In some embodiments, the shape or pattern formed by a display of the inputs may be dynamically altered. For example, instead of displaying inputs in a conventional rectangular shape, inputs may be dynamically displayed in a diamond or oval shape.

In some embodiments, the inputs that form a particular shape may be presented in sequential order. For example, if numerical inputs are displayed in an oval shape, the number "1" may be displayed on the top of the oval followed by the number "2" and then the numbers "3," "4," "6," "7," "8," "9," and "0". The number "0" would close the oval, and be followed by the number "1." In some embodiments, both the order of the inputs and the pattern of the inputs may be dynamically displayed.

For touch screen ATMs, the position of the displayed keys may be shifted to any position within the display area of the ATM screen. Shifting the position of displayed keys with respect to the overall display may allow a user to enter a PIN outside the view of a human observer or hidden camera.

In some embodiments, the touch screen of an ATM may offer a narrow viewing angle. A narrow viewing angle reduces the possibility that a camera or observer may view the specific input represented by a particular key.

The display illustrated in FIG. 17 may include fingerprint scanner 1703. In some embodiments, after each selection of a user PIN number displayed on the touch screen, the user may be required to touch the fingerprint scanner. The user may use this pattern of (1) selecting a PIN number and (2) subsequently touching a fingerprint scanner, while inputting of each of his PIN numbers. In these embodiments, a receiver may electronically associate each fingerprint input into the scanner with a PIN number selected prior to the receipt of the input fingerprint. The matching algorithm may use this information to determine the appropriate template to use when validating the input fingerprint(s).

FIG. 18 shows dynamic display 1801 based on shifting off-center, with respect to the overall display, the position of the displayed inputs. In FIG. 18 the numeric inputs 1805 and functional inputs 1807 have been shifted toward the top of display 1801. Additional information 1803 has been shifted toward the bottom of display 1801. Varying the positions of displayed inputs relative to the center of display 1801 preferably makes it more difficult for a hidden camera to record the hand movements of a customer.

The display illustrated in FIG. 18 may include fingerprint scanner 1809. In some embodiments, after each selection of a user PIN number displayed on the touch screen, the user may be required to touch the fingerprint scanner. The user may use this pattern of (1) selecting a PIN number and (2) subsequently touching a fingerprint scanner, while inputting of each of his PIN numbers. In these embodiments, a receiver may electronically associate each fingerprint input into the scanner with a PIN number selected prior to the receipt of the input fingerprint. The matching algorithm may use this information to determine the appropriate template to use when validating the input fingerprint(s).

Alternatively, the user may use a pattern of (1) touching a fingerprint scanner and (2) selecting a PIN number, while inputting each of his PIN numbers. In these embodiments, a receiver may electronically associate each fingerprint input into the scanner with a PIN number selected prior to the receipt of the input fingerprint. The matching algorithm may use this information to determine the appropriate template to use when validating the input fingerprint(s).

It should be noted that the patterns of touching the fingerprint scanner(s) and selecting PIN numbers may be included in multiple embodiments of the invention. For example, the patterns may be used on an ATM, a mobile phone, a personal computer, a tablet, or any other electronic device that includes mechanical keys/a touch screen and one or more fingerprint scanners.

It should additionally be noted that the layout of the PIN numbers may or may not change after one or more selections executed by the user when selecting his PIN number(s).

In yet other embodiments, a user may input a single piece of biometric information into fingerprint scanner 1809. In some of these embodiments, the user may continue to input the single piece of biometric information while selecting each of his PIN numbers. For example, a user may place a designated finger on fingerprint scanner 1809 and select his PIN numbers while his designated finger remains on fingerprint scanner 1809. It should be noted that the display of the PIN numbers may be static or may vary at least once while the user selects his PIN numbers.

Figure 19:
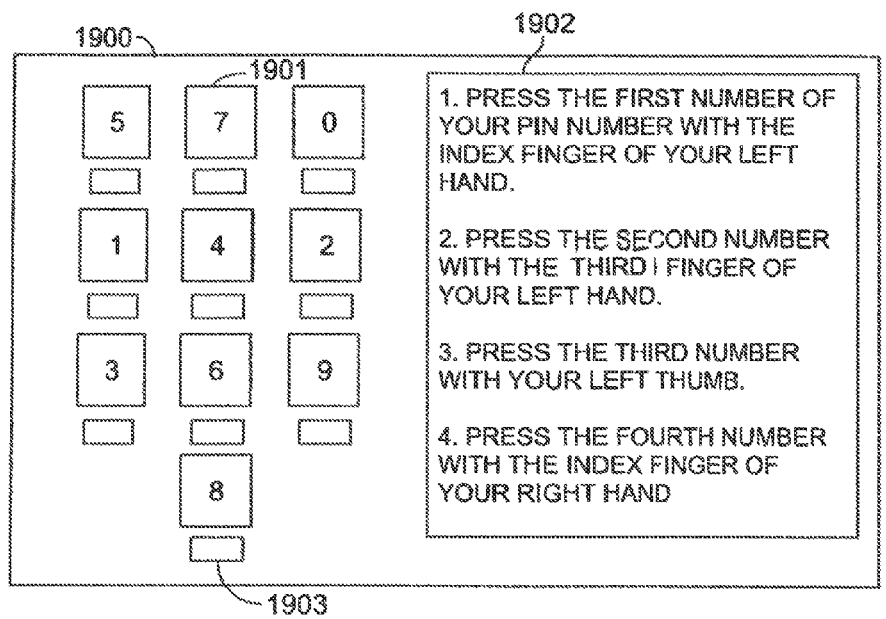
FIG. 19 shows a display of instructions for implementing an illustrative sequence of fingerprints for user authentication in conjunction with a dynamic display of inputs available for selection.

FIG. 19 shows illustrative ATM portion 1900 that may be included in an ATM in accordance with the invention. Illustrative ATM portion 1900 may include display screen(s) 1901, fingerprint scanner(s) 1903 and instructions 1902. In FIG. 19, display screens 1901 display a randomized layout of the numbers 0-9.

Instructions 1902 include a statement of a sequence of fingerprints to be used by a user while selecting his PIN numbers. It should be noted that, although instructions 1902 are displayed on the ATM in FIG. 19, in other embodiments of the invention instructions 1902 may be electronically transmitted to an ATM user by e-mail, text, or displayed on a user banking page. In these embodiments, instructions 1902 may not be displayed on an ATM. Rather, the user may be required to remember his fingerprint sequence or store his sequence in a location accessible to him prior to initiating a banking transaction. In other embodiments, the sequence of fingerprints may be transmitted to the user by e-mail or text after input of his banking card or other user identification information into the ATM.

Figure 20:
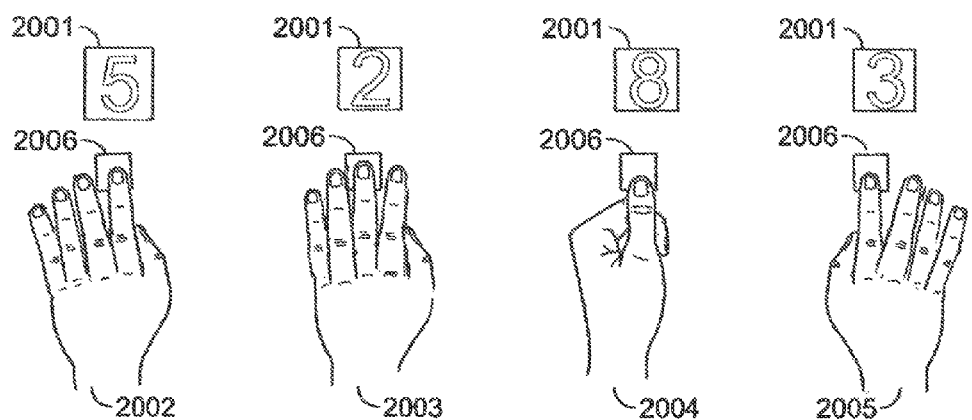
FIG. 20 shows an illustrative sequence of fingerprints for user authentication.

FIG. 20 shows an illustrative sequence of fingerprints used by a user to select his PIN in accordance with the systems and methods of the invention. In FIG. 20, a user with PIN '5283' is inputting his PIN by touching fingerprint scanners 2006 using a fingerprint sequence. It should be noted that, in FIG. 20, the user is inputting his PIN using the fingerprint sequence defined in instructions 1902 included in FIG. 19. Specifically, the user is using the fingerprint sequence of index finger of left hand 2002, middle finger of left hand 2003, left thumb 2004 and index finger of right hand 2005 to select his displayed PIN numbers.

Systems and methods for authenticating a user's identity at an ATM are provided. A method for authenticating a user's identity at an Automated Teller Machine ("ATM") includes using a first receiver to receive information from an ATM touch screen relating to a first numerical digit and a second numerical digit selected by the user. The method further includes using a second receiver to receive information from a fingerprint scanner relating to first biometric information input into the fingerprint scanner and second biometric information input into the fingerprint scanner, wherein the fingerprint scanner is removably coupled to the ATM via a USB port included in a secured portion of the ATM, the secured portion of the ATM being an inaccessible to the user. The method may also include using a transmitter to transmit the information received by the first receiver and the second receiver to a remote server via a telecommunications network.

Thus, systems and methods for user identification have been provided. Persons skilled in the art will appreciate that the present invention can be practiced by other than the described embodiments, which are presented for purposes of illustration rather than of limitation. The present invention is limited only by the claims that follow.

What is claimed is:

1. An Automated Teller Machine ("ATM") for authenticating an identity of a user, the ATM comprising:
    a fingerprint scanner being configured to capture at least a portion of user biometric information;
    a first mechanical key and a second mechanical key, the first mechanical key including a first display on the first mechanical key and the second mechanical key including a second display on the second mechanical key, each of the first display and the second display being configured to display at least one of a plurality of numerical digits;
    a first receiver configured to receive information from the first mechanical key and the second mechanical key, the information from the first mechanical key relating to a first numerical digit displayed on the first display during a depression of the first mechanical key, and the information from the second mechanical key relating to a second numerical digit displayed on the second display during a depression of the second mechanical key;
    a second receiver configured to receive information from the fingerprint scanner, the information including first biometric information associated with a first finger placed on the fingerprint scanner and second biometric information associated with a second finger placed on the fingerprint scanner; and
    a transmitter configured to transmit the information received by the first receiver and the second receiver to a remote server via a telecommunications network;
    wherein each of the first display and the second display are configured to alter their respective displays in the event that either the first mechanical key or the second mechanical key is depressed.

2. The ATM of claim 1 wherein the fingerprint scanner is removably coupled to the ATM via a USB port included on a user-accessible portion of the ATM.

3. The ATM of claim 1 wherein the fingerprint scanner is embedded in the ATM.

4. The ATM of claim 1 wherein the fingerprint scanner is removably coupled to the ATM via a USB port included in a secured portion of the ATM, the secured portion of the ATM being inaccessible to an ATM user.

5. The ATM of claim 1 wherein the first receiver is separate from the second receiver.

6. The ATM of claim 1 wherein the first receiver is substantially similar to the second receiver.

7. The ATM of claim 1 wherein the remote server is an interbank network.

8. The ATM of claim 1 wherein each of the first display and the second display are configured to alter their respective displays in the event that a user bank card is input into an ATM card holder.

9. The ATM of claim 1 wherein the second receiver is configured to associate a first timestamp with the first biometric information and a second timestamp with the second biometric information, wherein the first timestamp relates to a time that the second receiver received the first biometric information and the second timestamp relates to a time that the second receiver received the second biometric information.

10. The remote server of claim 9 wherein the remote server is configured to:
    determine whether biometric information associated with an earliest time stamp is substantially similar to a first stored template; and
    determine whether biometric information associated with a time stamp later than the earliest time stamp is substantially similar to a second stored template,
wherein:
    the first stored template and the second stored template are templates of user biometric information.

11. An Automated Teller Machine ("ATM") for authenticating an identity of a user, the ATM comprising:
    a fingerprint scanner being configured to capture at least a portion of user biometric information;
    a touch screen including a first display of a first numerical digit and a second display of a second numerical digit;
    a first receiver configured to receive information from the touch screen relating a selection of the first numerical digit;
    a second receiver configured to receive information from the fingerprint scanner, the information including first biometric information associated with a first finger placed on the fingerprint scanner,
    the first receiver being further configured to receive information from the touch screen relating to a selection of the second numerical digit;
    the second receiver being further configured to receive information from the fingerprint scanner, the information including second biometric information associated with a second finger placed on the fingerprint scanner, and
    a transmitter configured to transmit the information received by the first receiver and the second receiver to a remote server via a telecommunications network;
wherein each of the first display and the second display are configured to alter their respective displays in the event that either the first numerical digit or the second numerical digit is selected, wherein:
    the second receiver is configured to associate a first timestamp with the first biometric information and a second timestamp with the second biometric information, wherein the first timestamp relates to a time that the second receiver received the first biometric information and the second timestamp relates to a time that the second receiver received the second biometric information.

12. The ATM of claim 11 wherein the fingerprint scanner is removably coupled to the ATM via a USB port included on a user-accessible portion of the ATM.

13. The ATM of claim 11 wherein the fingerprint scanner is embedded in the ATM.

14. The ATM of claim 11 wherein the fingerprint scanner is removably coupled to the ATM via a USB port included in a secured portion of the ATM, the secured portion of the ATM being inaccessible to an ATM user.

15. The ATM of claim 11 wherein the first receiver is separate from the second receiver.

16. The ATM of claim 11 wherein the first receiver is substantially similar to the second receiver.

17. The ATM of claim 11 wherein the remote server is an interbank network.

18. The ATM of claim 11 wherein each of the first display and the second display are configured to alter their respective displays in the event that a user bank card is input into an ATM card holder.

19. The ATM of claim 18 wherein the altering of the displays includes altering the numerical digit displayed by each of the first display and the second display.

20. The ATM of claim 19 wherein the altering of the displays includes altering the location of the numerical digit displayed by each of the first display and the second display.

21. The remote server of claim 11 wherein the remote server is configured to:
   determine whether biometric information associated with an earliest time stamp is substantially similar to a first stored template; and
   determine whether biometric information associated with a time stamp later than the earliest time stamp is substantially similar to a second stored template, wherein:
      the first stored template and the second stored template are templates of user biometric information.

22. One or more non-transitory computer-readable media storing computer-executable instructions which, when executed by a processor on a computer system, perform a method for authenticating a user's identity at an Automated Teller Machine ("ATM"), the method comprising:
   using a first electronic receiver being to receive information from an ATM touch screen relating to a first numerical digit and a second numerical digit selected by the user;
   using a second electronic receiver to receive information from a fingerprint scanner relating to first biometric information input into the fingerprint scanner and second biometric information input into the fingerprint scanner, wherein the fingerprint scanner is removably coupled to the ATM via a USB port included in a secured portion of the ATM, the secured portion of the ATM being inaccessible to the user; and
   using a transmitter to transmit the information received by the first receiver and the second receiver to a remote server via a telecommunications network;
   wherein each of a first display and a second display are configured to alter their respective displays in the event that either the first numerical digit or the second numerical digit is selected; wherein:
      the second electronic receiver is configured to associate a first timestamp with the first biometric information and a second timestamp with the second biometric information, wherein the first timestamp relates to a time that the second electronic receiver received the first biometric information and the second timestamp relates to a time that the second electronic receiver received the second biometric information.

23. An Automated Teller Machine ("ATM") including apparatus for authenticating an identity of a user, the ATM comprising:
   a receiver configured to receive user identification information included on an ATM banking card;
   a USB port being configured to be connected to a fingerprint scanner, wherein the fingerprint scanner is configured to receive user biometric information;
   a plurality of mechanical keys, each of the plurality of mechanical keys including a display;
   the receiver being further configured to receive information from a subset of the plurality of mechanical keys in the event that a user depresses each of the subset of mechanical keys, wherein the information received from each of the subset of the plurality of mechanical keys includes a numerical digit displayed on the mechanical key during the depression of the subset of mechanical keys;
   the receiver being further configured to receive user biometric information from the USB port relating to user fingerprints placed on the fingerprint scanner;
   a transmitter configured to transmit to a remote server, in encrypted format, the user identification information, the numerical digits displayed on the subset of the mechanical keys during the depression of the subset of mechanical keys and the biometric information; and
   a receiver configured to receive from the remote server a determination relating to whether or not the ATM is authorized to initiate a user banking session, wherein the authorization is based at least in part on whether (1) the biometric information received is substantially similar to a stored fingerprint sequence associated with the user and (2) and the numerical digits displayed on the subset of the mechanical keys during the depression of the subset of mechanical keys correspond to a user PIN number;
   wherein each of a first display of a first mechanical key and a second display of a second mechanical key are configured to alter their respective displays in the event that either the first mechanical key or the second mechanical key is depressed.

24. An Automated Teller Machine ("ATM") for authenticating an identity of a user, the ATM comprising:
   a fingerprint scanner being configured to capture at least a portion of user biometric information;
   a first depressible key and a second depressible key, the first depressible key including a first display and the second depressible key including a second display, each of the first display and the second display being configured to display at least one of a plurality of numerical digits;
   a first receiver configured to receive information from the first depressible key and the second depressible key, the information from the first depressible key relating to a first numerical digit displayed by the first display during a depression of the first depressible key, and the information from the second depressible key relating to a second numerical digit displayed by the second display during a depression of the second depressible key;
   a second receiver configured to receive information from the fingerprint scanner, the information including first biometric information associated with a first finger placed on the fingerprint scanner and second biometric information associated with a second finger placed on the fingerprint scanner; and
   a transmitter configured to transmit the information received by the first receiver and the second receiver to a remote server via a telecommunications network;
   wherein the second receiver is configured to associate a first timestamp with the first biometric information and a second timestamp with the second biometric information, wherein the first timestamp relates to a time that the second receiver received the first biometric information and the second timestamp relates to a time that the second receiver received the second biometric information.

25. The remote server of claim 24 wherein the remote server is configured to:
  determine whether biometric information associated with an earliest time stamp is substantially similar to a first stored template; and
  determine whether biometric information associated with a time stamp later than the earliest time stamp is substantially similar to a second stored template,
wherein:
  the first stored template and the second stored template are templates of user biometric information.

26. An Automated Teller Machine ("ATM") for authenticating an identity of a user, the ATM comprising:
  a fingerprint scanner being configured to capture at least a portion of user biometric information;
  a touch screen including a display of a first numerical digit and a second numerical digit;
  a first receiver configured to receive information from the touch screen relating a selection of the first numerical digit;
  a second receiver configured to receive information from the fingerprint scanner, the information including first biometric information associated with a first finger placed on the fingerprint scanner,
  the first receiver being further configured to receive information from the touch screen relating to a selection of the second numerical digit;
  the second receiver being further configured to receive information from the fingerprint scanner, the information including second biometric information associated with a second finger placed on the fingerprint scanner; and
  a transmitter configured to transmit the information received by the first receiver and the second receiver to a remote server via a telecommunications network;
wherein the second receiver is configured to associate a first timestamp with the first biometric information and a second timestamp with the second biometric information, wherein the first timestamp relates to a time that the second receiver received the first biometric information and the second timestamp relates to a time that the second receiver received the second biometric information.

27. An Automated Teller Machine ("ATM") for authenticating an identity of a user, the ATM comprising:
  a fingerprint scanner being configured to capture at least a portion of user biometric information;
  a touch screen including a first display of a first numerical digit and a second display of a second numerical digit;
  a first receiver configured to receive information from the touch screen relating a selection of the first numerical digit;
  a second receiver configured to receive information from the fingerprint scanner, the information including first biometric information associated with a first finger placed on the fingerprint scanner;
  the first receiver being further configured to receive information from the touch screen relating to a selection of the second numerical digit;
  the second receiver being further configured to receive information from the fingerprint scanner, the information including second biometric information associated with a second finger placed on the fingerprint scanner; and
  a transmitter configured to transmit the information received by the first receiver and the second receiver to a remote server via a telecommunications network;
wherein each of the first display and the second display are configured to alter their respective displays in the event that a user bank card is input into an ATM card holder; and
wherein the remote server is configured to:
  determine whether biometric information associated with an earliest time stamp is substantially similar to a first stored template; and
  determine whether biometric information associated with a time stamp later than the earliest time stamp is substantially similar to a second stored template, wherein the first stored template and the second stored template are templates of user biometric information.

* * * * *